US005544080A

United States Patent [19]

Kobayashi et al.

[11] Patent Number: 5,544,080

[45] Date of Patent: Aug. 6, 1996

[54] VIBRATION/NOISE CONTROL SYSTEM

[75] Inventors: Toshiaki Kobayashi; Hidetaka Ozawa, both of Wako, Japan

[73] Assignee: Honda Giken Kogyo Kabushiki Kaisha, Tokyo, Japan

[21] Appl. No.: 189,912

[22] Filed: Feb. 1, 1994

[30] Foreign Application Priority Data

Feb. 2, 1993 [JP] Japan .................................. 5-037458
Mar. 22, 1993 [JP] Japan .................................. 5-086823

[51] Int. Cl.[6] .................................................. G01H 17/00

[52] U.S. Cl. .......................... 364/574; 364/463; 364/572; 381/71

[58] Field of Search .................................... 364/572–581, 364/463; 381/71; 244/17.1

[56] References Cited

U.S. PATENT DOCUMENTS 5,146,505 9/1992 Pfaff et al. ......................... 381/71 OR
5,245,552 9/1993 Andersson et al. ....................... 381/71

FOREIGN PATENT DOCUMENTS 8802912 4/1988 WIPO .
9013108 11/1990 WIPO .

OTHER PUBLICATIONS

Alain Roure; "Fast Algorithms in Active Noise or Vibration Control"; IEEE, ICASSP '88: Acoustics, Speech & Signal Proc. Cont. pp. 2582–2585.

*Primary Examiner*—Edward R. Cosimano
*Assistant Examiner*—Kamini S. Shah
*Attorney, Agent, or Firm*—Lyon & Lyon

[57] ABSTRACT

A sine wave signal generated in synchronism with a pulse signal determining a frequency of vibrations and noises generated by a vibration/noise source is input to a W filter and a C filter. The C filter selects filter coefficients dependent on the rotational speed of an engine, and generates a transfer characteristic-dependent reference signal R dependent on a transfer characteristic of a vibration/noise-transmitting path, based on the filter coefficients. Alternatively, a divisional signal is prepared by dividing a repetition period of vibrations and noises by a predetermined number, and values of a sine wave generated in synchronism with occurrence of said divisional signal is delivered to a W filter, while the transfer characteristic-dependent reference signal is delivered from the C filter storing data of the transfer characteristic identified in advance to the W filter. Alternatively, a sine wave signal and a delayed sine wave signal delayed by a quarter of a repetition period of the sine wave relative to the sine wave, as well as phase and amplitude-related information of the transfer characteristic of the path are generated and delivered in synchronism with generation of the divisional signal. These sine wave signals and the transfer characteristic-dependent reference signal (phase and amplitude-related information) are used to actively control the vibrations and noises.

16 Claims, 18 Drawing Sheets

PULSE SIGNAL

PRIMARY
REFERENCE SIGNAL

PULSE SIGNAL Y

SECONDARY
REFERENCE SIGNAL $U_2$

FIG.8a
VARIABLE SAMPLING
PULSE SIGNAL Psr
FIG.8b
DIGITAL VALUES
OF SINE WAVE SIGNAL
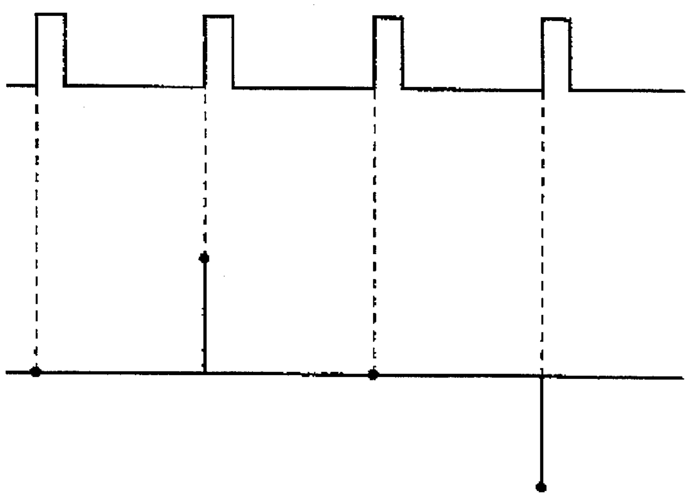
FIG.8c
VARIABLE SAMPLING
PULSE SIGNAL Psr
FIG.8d
DIGITAL VALUES
OF SINE WAVE SIGNAL
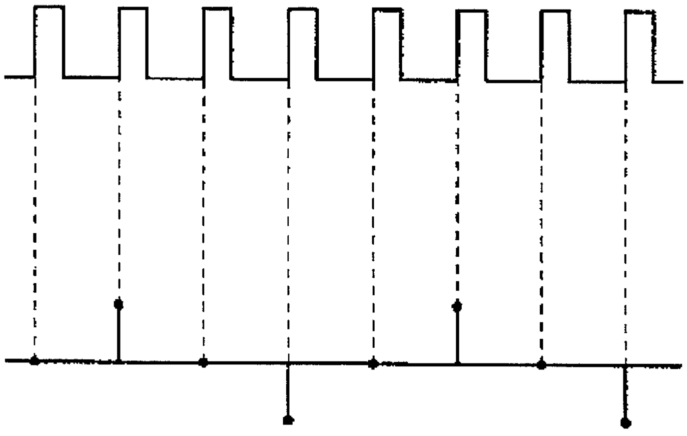

*FIG.15*

| F | $F_0 \leqq F < F_1$ | $F_1 \leqq F < F_2$ | $F_2 \leqq F < F_3$ | · · · · · | $F_{n-1} \leqq F < F_n$ |
|---|---|---|---|---|---|
| m | $mmap_{(0)}$ | $mmap_{(1)}$ | $mmap_{(2)}$ | · · · · · | $mmap_{(n)}$ |

FIG.17a VARIABLE SAMPLING PULSE SIGNAL Psr

FIG.17b SINE WAVE SIGNAL

FIG.17c DELAYED SINE WAVE SIGNAL

VIBRATION/NOISE CONTROL SYSTEM

BACKGROUND OF THE INVENTION

1. Field of the Invention

This invention relates to a vibration/noise control system, and more particularly to a vibration/noise control system adapted to actively control vibrations and noises with a periodicity or a quasi-periodicity generated from a rotating member and the like, for reduction thereof.

2. Prior Art

Recently, active vibration/noise control systems have been developed in various fields of the industry, which are adapted to damp vibrations and noises produced from vibration/noise sources by the use of an adaptive digital filter (hereinafter referred to as an "ADF") to thereby reduce the vibrations and noises.

One of the conventional active vibration/noise control systems of various types is a vibration/noise control system proposed by the present assignee, which is suitable for reducing vibrations and noises generated from an engine of an automotive vehicle and the like with a periodicity or a quasi-periodicity (Japanese Patent Application No. 4-88075, which is incorporated in U.S. Ser. No. 08/029,909, now U.S. Pat. No. 5,386,372, and hereinafter referred to as "the first prior art"). This system comprises an adaptive control circuit supplied with a predetermined pulse signal (trigger signal) related to driving of a power plant, and first filter means comprised of an ADF for adaptive control of the vibrations and noises.

According to the first prior art, the pulse signal is directly supplied to the adaptive control circuit, which makes it possible to reduce the number of complicated product-sum operations to thereby enhance a converging speed of the adaptive control for reducing the vibrations and noises. Further, the pulse signal is input to the adaptive control circuit at proper time intervals dependent on operating conditions of the engine for execution of the adaptive control dependent on the proper time intervals. This makes it possible to perform the vibration/noise control with high accuracy. Further, according to the first prior art, the sampling repetition period is varied depending on timing of operation of each pulse of the pulse signal, and hence even for a power plant which produces vibrations and noises having waveforms changing largely due to changes in the rotational speed of an engine thereof, the sampling repetition period can be varied according to the changes in the rotational speed of the engine, which makes it possible to attain an increased speed of follow-up in control, and hence to perform the adaptive control with high accuracy.

Further, an active vibration control system which uses a sine wave signal as a reference signal to be input to an ADF has already been proposed by International Publication No. W088/02912 (hereinafter referred to as "the second prior art"), which counts pulses of a pulse sequence signal related to the rotational speed of an engine, and generates the sine wave signal in synchronism with a predetermined clock pulse signal.

The second prior art counts pulses of the pulse sequence signal at a constant sampling frequency based on the predetermined clock pulse signal to thereby generate two predetermined trigonometric functions, and then synthesizes these trigonometric functions by the use of an oscillator into the sine wave signal of a digital type.

Further, a vibration control system which is adapted to perform the adaptive control based on a signal sampled in synchronism with the rotation of the engine has been proposed e.g. by International Publication No. W090/13108 (hereinafter referred to as "the third prior art"), which subjects an error signal to an orthogonal transformation, such as Discrete Fourier Transform (DFT), to control vibrations and noises peculiar to respective component parts of the engine, independently of changes in the rotational speed of the engine.

The third prior art subjects waveforms of vibrations and noises peculiar to respective component parts of the engine to the orthogonal transformation to deliver control signals prepared by filtering of the waveforms of vibrations and noises for control of the vibrations and noises as desired.

However, in the first prior art proposed by the present assignee, the reference signal input to the ADF is the pulse signal, and hence the ADF is required to have a tap length adaptable to all variations of the reference signal. Further, depending on the repetition period of vibrations and noises, the tap length can become so long that the product-sum operation (convolution) takes much time to lower the converging speed of the adaptive control.

Further, in the first prior art, the adaptive control circuit is provided with second filter means for correcting changes in phase, amplitude, etc. of the control signal caused by the transfer characteristic (transfer function) of a path through which the vibrations and noises are transmitted, and filter coefficients of the first filter means are updated taking a second reference signal output from the second filter means. However, a proper value of the transfer function of the path varies with periodicity of the reference signal (pulse signal) input, and hence when the sampling frequency, which is dependent on the timing of inputting of the reference signal, undergoes a change, it is required to change the filter coefficients of the second filter means representative of the transfer characteristic (transfer function) of the path according to the changes in the sampling frequency. This complicates the computing processings.

In the second prior art, the two trigonometric functions are synthesized by the oscillator into the digital sine wave signal. The synthesis of the sine wave signal takes much time. Further, when the count of clock pulses is deviated from a proper value, a spike (a phenomenon of generation of a distortion in the form of a pulse waveform of a very short duration relative to the pulse width) and jitter (a phenomenon of the pulse width being instable) can occur.

Further, in the second prior art, even if the sine wave signal is used for the reference signal, the filter means representative of the transfer characteristic of the path is required for each of the frequency components of vibrations and noise. This increases the tap length (number of filter coefficients) of the filter means and hence the processing takes much time to degrade the convergence of the adaptive control. Therefore, there can be a case in which the system cannot follow up changes in the rotational speed of the engine.

Further, in the third prior art, to make the system adaptable to changes in the sampling frequency dependent on the periodicity of vibrations and noises generated from various sources, it is required to store in advance filter means representative of transfer characteristics of the path by the use of a large number of storage elements, or alternatively store in advance a small number of filter means representative of the transfer characteristics, and then set proper filter means by interpolation based on the stored filter means according to the frequency components to allow them to properly represent the transfer characteristics of the path.

Therefore, it is either required to use a lot of storage elements, or to spare much time for the processing.

SUMMARY OF THE INVENTION

It is the object of the invention to provide a vibration/noise control system which is reduced in computation load thereon to thereby attain an enhanced converging speed of control of vibrations and noises.

To attain the above object, the present invention provides a vibration/noise control system for controlling vibrations and noises generated from a vibration/noise source, with a periodicity or a quasi-periodicity, the vibration/noise source having at least a rotational member, including first filter means for generating a control signal for control of the vibrations and noises, a driving signal-forming means for converting the control signal into a driving signal to be delivered to a vibration/noise-transmitting path through which the vibrations and noises are transmitted, error signal-forming means for generating an error signal indicative of a difference between the driving signal transmitted through the vibration/noise-transmitting path and a vibration/noise signal indicative of the vibrations and noises generated from the vibration/noise source, second filter means for generating a transfer characteristic-dependent reference signal reflecting a transfer characteristic of the vibration/noise-transmitting path, and control signal-updating means for updating filter coefficients of the first filter means based on the error signal output from the error signal-forming means, the transfer characteristic-dependent reference signal output from the second filter means, and the filter coefficients of the first filter means, such that the error signal becomes the minimum.

The vibration/noise control system according to a first aspect of the invention is characterized by comprising:

pulse signal-generating means for detecting rotation of the rotational member whenever the rotational member rotates through each predetermined very small degree, and generating a pulse signal indicative of detected rotation; and reference signal-forming means for forming a reference signal corresponding to a repetition period of vibrations and noises peculiar to a component part of the vibration/noise source, based on an interval of occurrences of pulses of the pulse signal generated by the pulse signal-generating means, and delivering the reference signal to the first filter means;

wherein the reference signal-forming means has sine wave-forming means for forming a sine wave having a single repetition period per the repetition period of the vibrations and noises peculiar to the component part of the vibration/noise source, and wherein the second filter means has:

correction value-selecting means for selecting a correction value representative of the transfer characteristic according to a rotational speed of the rotational member, and transfer characteristic-dependent reference signal-forming means for correcting the reference signal based on the correction value selected by the correction value-selecting means, into the transfer characteristic-dependent reference signal.

According to the vibration/noise control system having the above construction, the sine wave having a single repetition period corresponding to a repetition period of vibrations and noises peculiar to the component parts of the vibration/noise source is input to the first filter means as the reference signal. Since the reference signal used in the present system has a waveform of a sine wave with a single repetition period corresponding to the repetition period of the vibrations and noises peculiar to the component parts of the vibration/noise source, a small number of taps are required for the first filter means, which reduces a time period required in the product-sum operation (convolution), thereby enhancing a converging speed of the control.

Further, the correction value is selected according to the rotational speed of the rotational member, and the reference signal is corrected based on the correction value to form the transfer characteristic-dependent reference signal, whereby the transfer function of the second filter means representative of the transfer characteristic of the vibration/noise-transmitting path is set properly, and accordingly the second filter means generates and delivers the transfer characteristic-dependent reference signal to the control signal-updating means as the transfer characteristic-reference signal. Therefore, with the second filter means as well, it is not required to store in advance data of frequency characteristics in high orders to adapt the system to variation in vibrations and noises. This makes it possible to adapt the system to the transfer characteristic of the path according to the repetition period of vibrations and noises easily and promptly, enabling the adaptive control with a high accuracy.

Preferably, the correction value-selecting means has a table storing data of the transfer characteristic of the vibration/noise-transmitting path.

Preferably, the first filter means comprises at least one adaptive digital filter.

Preferably, the first filter means includes control signal correction value-selecting means for selecting a control signal correction value depending on variation in the rotation of the rotational member, and control signal-forming means for correcting the reference signal based on the control signal correction value to form the control signal.

More preferably, the control signal correction value-selecting means includes first storage means for storing filter coefficients corresponding to a predetermined transfer characteristic dependent on the rotational speed of the rotational member, and second storage means for storing results of updating by the control signal-updating means for updating the filter coefficients of the first filter means, and selects one of the filter coefficients corresponding to the predetermined transfer characteristic stored in the first storage means and the results of updating by the control signal-updating means, depending on a change in the rotation of the rotational member.

Preferably, the control signal is delivered from the first filter means, and at the same time the error signal from the error signal-forming means is detected in synchronism with the pulse signal generated by the pulse signal-generating means.

According to a second aspect of the invention, there is provided a vibration/noise control system for controlling vibrations and noises generated from a vibration/noise source, with a periodicity or a quasi-periodicity, the vibration/noise source having at least a rotational member, including first filter means having an adaptive digital filter for generating a control signal for control of the vibrations and noises, a driving signal-forming means for converting the the control signal into a driving signal to be delivered to a vibration/noise-transmitting path through which the vibrations and noises are transmitted, error signal-forming means for generating an error signal indicative of a difference between the driving signal transmitted through the vibration/noise-transmitting path and a vibration/noise signal indicative of the vibrations and noises generated from the vibration/noise source, second filter means for generating a transfer characteristic-dependent reference signal reflecting a transfer characteristic of the vibration/noise-transmitting path, and control signal-updating means for updating filter coefficients of the first filter means based on the error signal output from the error signal-forming means, the transfer characteristic-dependent reference signal output from the second filter means, and the filter coefficients of the first filter means, such that the error signal becomes the minimum.

The vibration/noise control system according to the second aspect of the invention is characterized by comprising:

driving repetition period signal-generating means for generating a driving repetition period signal corresponding to a repetition period of vibrations and noises peculiar to a component part of the vibration/noise source, whenever the rotational member rotates through a predetermined rotational angle;

divisional signal-generating means for generating a plurality of pulses of a divisional signal during a repetition period of the driving repetition period signal generated by the driving repetition period signal-generating means; and reference signal generating means for generating a reference signal formed of a sine wave having a single repetition period per the repetition period of vibrations and noises according to timing of inputting of the divisional signal generated by the divisional signal generating means;

wherein the adaptive digital filter of the first filter means has two taps; and the system includes setting means for setting the number N of the plurality of pulses of the divisional signal generated by the divisional signal-generating means per the repetition period of the driving repetition period signal to a range of:

$$3 \leqq N \leqq 7$$

where N is a real number.

According to the above construction, the number N of occurrence of the divisional signal is set within a range of $3 \leqq N \leqq 7$ (provided that N is a real number). This makes it possible to converge filter coefficients in a short time period without divergence, even if a delay $\phi$ in phase of the control signal is caused by the vibration/noise transmitting path. Particularly, when the number N is equal to 4, the locus of the amplitude forms a perfect circle, which makes it possible to attain reduction of vibrations and noises in an excellent manner.

Preferably, the number N of the plurality of pulses of the divisional signal set by the setting means is equal to 4.

More preferably, the setting means is formed by frequency-dividing means for frequency-dividing a driving frequency pulse signal used in the control means.

Preferably, the vibration/noise control system includes sampling period signal-generating means for generating a sampling period signal indicative of a sampling repetition period for controlling a sequence of operations for delivering and updating filter coefficients of the first filter means, based on a driving frequency for driving control means for controlling the rotational member, and delay period-determining means for determining a delay period of the adaptive digital filter based on the repetition period of the driving repetition period signal generated by the driving repetition period signal-generating means and the sampling period signal, the system comprising delay period-changing means for changing the delay period according to a change in the repetition period of the driving repetition period signal when the repetition period of the driving period has changed, and filter coefficient-changing means for forcibly changing the filter coefficient of the adaptive digital filter.

According to a third aspect of the invention, there is provided a vibration/noise control system for controlling vibrations and noises generated from a vibration/noise source, with a periodicity or a quasi-periodicity, the vibration/noise source having at least a rotational member, including first filter means having an adaptive digital filter for generating a control signal for control of the vibrations and noises, a driving signal-forming means for converting the the control signal into a driving signal to be delivered to a vibration/noise-transmitting path through which the vibrations and noises are transmitted, error signal-forming means for generating an error signal indicative of a difference between the driving signal transmitted through the vibration/noise-transmitting path and a vibration/noise signal indicative of the vibrations and noises generated from the vibration/noise source, second filter means for generating a transfer characteristic-dependent reference signal reflecting a transfer characteristic of the vibration/noise-transmitting path, and control signal-updating means for updating filter coefficients of the first filter means based on the error signal output from the error signal-forming means, the transfer characteristic-dependent reference signal output from the second filter means, and the filter coefficients of the first filter means, such that the error signal becomes the minimum.

The vibration/noise control system according to the third aspect of the invention is characterized by comprising:

driving repetition period signal-generating means for generating a driving repetition period signal corresponding to a repetition period of vibrations and noises peculiar to a component part of the vibration/noise source, whenever the rotational member rotates through a predetermined rotational angle;

divisional signal-generating means for generating a large number of pulses of a divisional signal during each repetition period of the driving repetition period signal generated by the driving repetition period signal generating means whenever the rotational member rotates through each very small rotational angle; and reference signal-storing means for storing a reference signal dependent on timing of occurrence of pulses of the divisional signal, the reference signal being delivered to the first filter means;

wherein the adaptive digital filter of the first filter means has two taps; and wherein the reference signal storing means has sine wave storing means for storing a single repetition period of a sine wave corresponding to the repetition period of the vibrations and noises generated from the vibration/noise source, and delayed signal storing means for storing a delayed sine wave signal delayed by a predetermined delay ratio M relative to the repetition period of the sine wave signal, the system including setting means for setting the predetermined delay ratio M to a range of:

$$\tfrac{1}{3}x \geqq M \geqq \tfrac{1}{7}$$

where M is a real number.

According to the above construction, the sine wave signal with the single repetition period per repetition period of vibrations and noises, and the delay sine wave signal which is delayed by the predetermined delay ratio M (M is within a range of $\tfrac{1}{3}$ $M \geqq \tfrac{1}{7}$, provided that M is a real number) relative to the repetition period of the sine wave signal are input to the first filter means. This also makes it possible to attain similar effects obtained by the systems according to other aspects of the invention. That is, a coefficient of one of two taps of the adaptive digital filter is updated based on the reference signal formed based on the sine wave signal, and a coefficient of the other of two taps is updated by the reference signal formed based on the delayed reference signal, which provides effects similar to those obtained by dividing a repetition period of vibrations and noises by four. Especially, according to this aspect of the invention, the divisional signal is generated for each very small angle of rotation of the rotational member, it is possible to perform much more delicate control compared with the above-mentioned aspect of the invention performed by dividing the repetition period of vibrations and noises by four, which makes it possible to perform the adaptive control with even more excellent convergence.

Preferably, the predetermined delay ratio M set by the setting means is equal to ¼.

Preferably, the vibration/noise control system includes sampling period signal-generating means for generating a sampling period signal indicative of a sampling repetition period for controlling a sequence of operations for delivering and updating filter coefficients of the first filter means, based on a driving frequency for driving control means for controlling the rotational member.

More preferably, the vibration/noise control system includes execution means for executing the sequence of operations for delivering and updating filter coefficients of the first filter means, in synchronism with occurrence of the pulses of the divisional signal.

Preferably, the second filter means includes transfer characteristic storage means for storing phase and amplitude-related transfer characteristics of the vibration/noise-transmitting path, and selects and delivers one of the phase and amplitude-related transfer characteristic stored in the transfer characteristic storage means according to each interval of occurrence of the pulses of divisional signal generated by the divisional signal generating means.

More preferably, the transfer characteristic storage means includes gain variable-storing means for storing a gain variable of the transfer characteristic-dependent reference signal input to the control signal-updating means.

The above and other objects, features, and advantages of the invention will become more apparent from the following detailed description taken in conjunction with the accompanying drawings.

BRIEF DESCRIPTION OF THE DRAWINGS

FIG. 3*a* and FIG. 3*b* show the relationship between a pulse signal and a primary reference signal, in which:

FIG. 3*a* shows the pulse signal Y; and

FIG. 3*b* shows the primary reference signal $U_1$;

FIG. 4*a* and FIG. 4*b* show the relationship between the pulse signal and a secondary reference signal, in which:

FIG. 4*a* shows the pulse signal Y; and

FIG. 4*b* shows the secondary reference signal $U_2$;

FIG. 8*a* to FIG. 8*d* show the relationship between variable sampling pulse signals Psr and digital values of respective sine wave signals, in which:

FIG. 8*a* shows a variable sampling pulse signal Psr;

FIG. 8*b* shows digital values of a sine wave signal corresponding to FIG. 8*a* signal;

FIG. 8*c* shows a variable sampling pulse signal Psr; and

FIG. 8*d* shows digital values of a sine wave signal corresponding to FIG. 8*c* signal;

FIG. 10*a* and FIG. 10*b* are diagrams which are useful in explaining convergence of the adaptive control by the system of the second embodiment compared with that of the first embodiment, in which:

FIG. 10*a* shows changes in the amplitude of error signals of the first and second embodiments when the adaptive control is performed; and FIG. 10*b* shows changes in the amplitude of error signals of the first and second embodiments when the adaptive control is not preformed.

FIG. 15 shows an F table for use in calculation of the optimum degree of the W filter;

FIG. 17*a* to FIG. 17*c* show the relationship 15 between a variable sampling pulse signal Psr, and a sine wave signal, and a delayed sine wave signal stored in reference signal-storing means, in which:

FIG. 17*a* shows the variable sampling pulse signal Psr;

FIG. 17*b* shows the sine wave signal; and

FIG. 17*c* shows the delayed sine wave signal;

FIG. 19*a* and FIG. 19*b* are diagrams which are useful in explaining convergence of the adaptive control by the system of the fourth embodiment compared with that of the second embodiment, in which:

FIG. 19*a* shows changes in the amplitude of error signals of the second and fourth embodiments when the adaptive control is performed; and FIG. 19*b* shows changes in the amplitude of the error signals of the second and fourth embodiments when the adaptive control is not performed.

DETAILED DESCRIPTION

Next, a vibration/noise control system according to the invention will be described in detail with reference to drawings showing embodiments in which the system is applied to an automotive vehicle.

Figure 1:
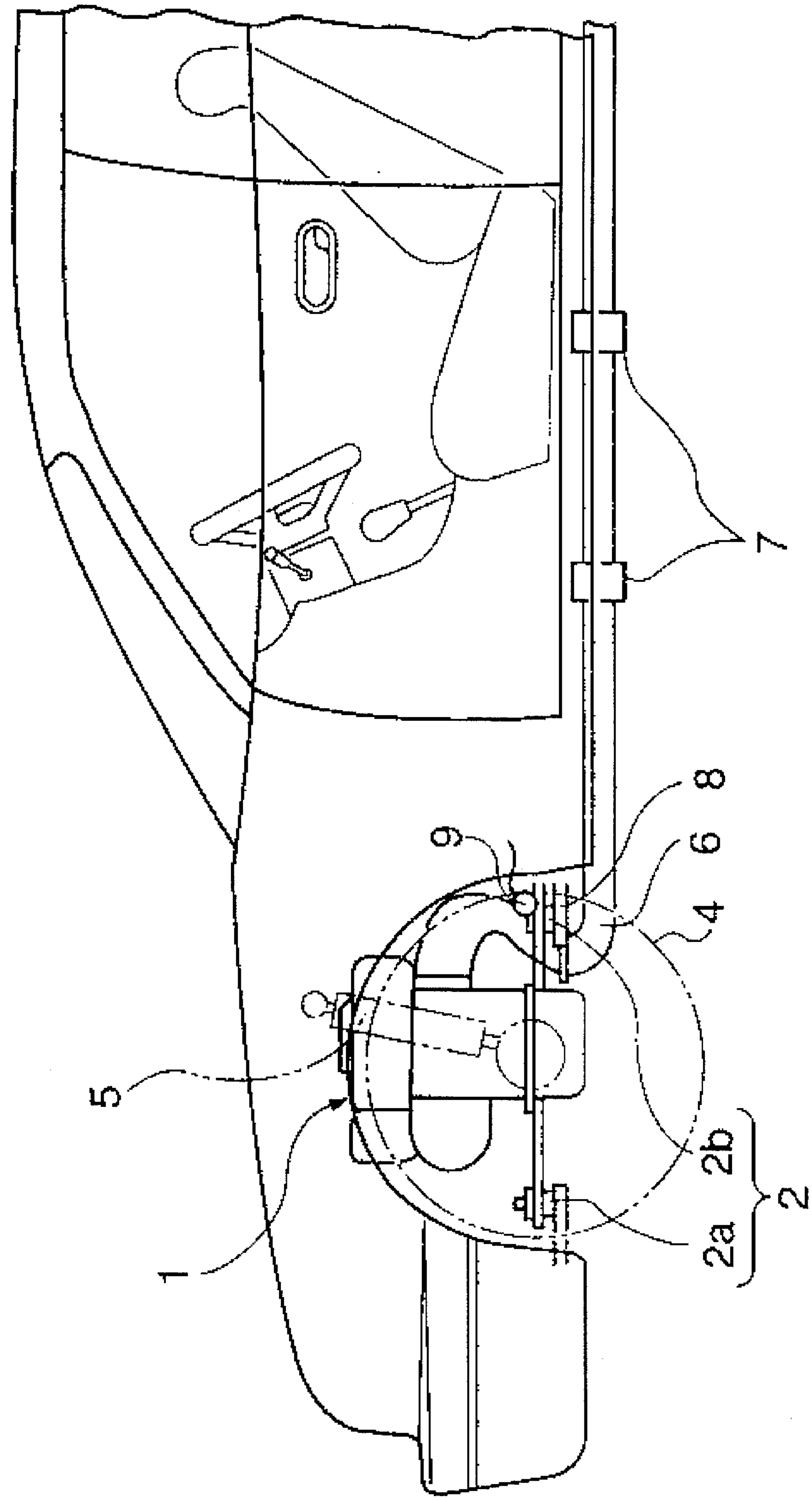
FIG. 1 is a schematic diagram showing how an engine is mounted on an automotive vehicle, and where an error sensor is provided.

FIG. 1 shows an automotive vehicle having a chassis on which is mounted an engine, as a source of vibrations and noises having a periodicity or a quasi-periodicity.

In the figure, reference numeral 1 designates the engine of a four-stroke cycle type having straight four cylinders (hereinafter simply reference to as "the engine") of a power plant for driving an automotive vehicle. The engine 1 is supported on the chassis 8 by an engine mount 2, a suspension device 5 for front wheels (driving wheels) 4, and a supporting member 7 for an exhaust pipe 6.

Further, the engine mount 2 is comprised of a suitable number of self-expanding engine mounts 2*a* as electromechanical transducer means which are capable of changing vibration-transmitting characteristics thereof, and a suitable number of normal engine mounts 2*b* which are incapable of changing the vibration-transmitting characteristics.

The self-expanding engine mounts 2*a* have respective actuators incorporated therein, which are formed of voice coil motors (VCM), piezo-electric elements, magnetostrictive elements, or the like, and operate to control transmission of vibrations of the engine according to a signal from an electronic mount control unit (hereinafter referred to as "the EMCU"), not shown, in a manner responsive to vibrations of the engine. More specifically, the self-expanding engine mounts 2*a* are formed therein with respective liquid chambers, not shown, which are filled with liquid, and operate to prevent vibrations from being transmitted from a vibration source (i.e. the engine 1) to the chassis, via elastic rubbers, not shown, fixed to the vibration source by means of the actuators.

A vibration error sensor 9 is provided in the vicinity of the engine mounts 2*b* for generating an error signal $\epsilon$.

A rotation sensor, not shown and formed of a magnetic sensor and the like, for detecting rotation of the flywheel is arranged in the vicinity of a flywheel, not shown, fixed to a crankshaft, not shown, of the engine 1. The rotation sensor counts teeth of a ring gear mounted on the flywheel as the flywheel rotates.

Figure 2:
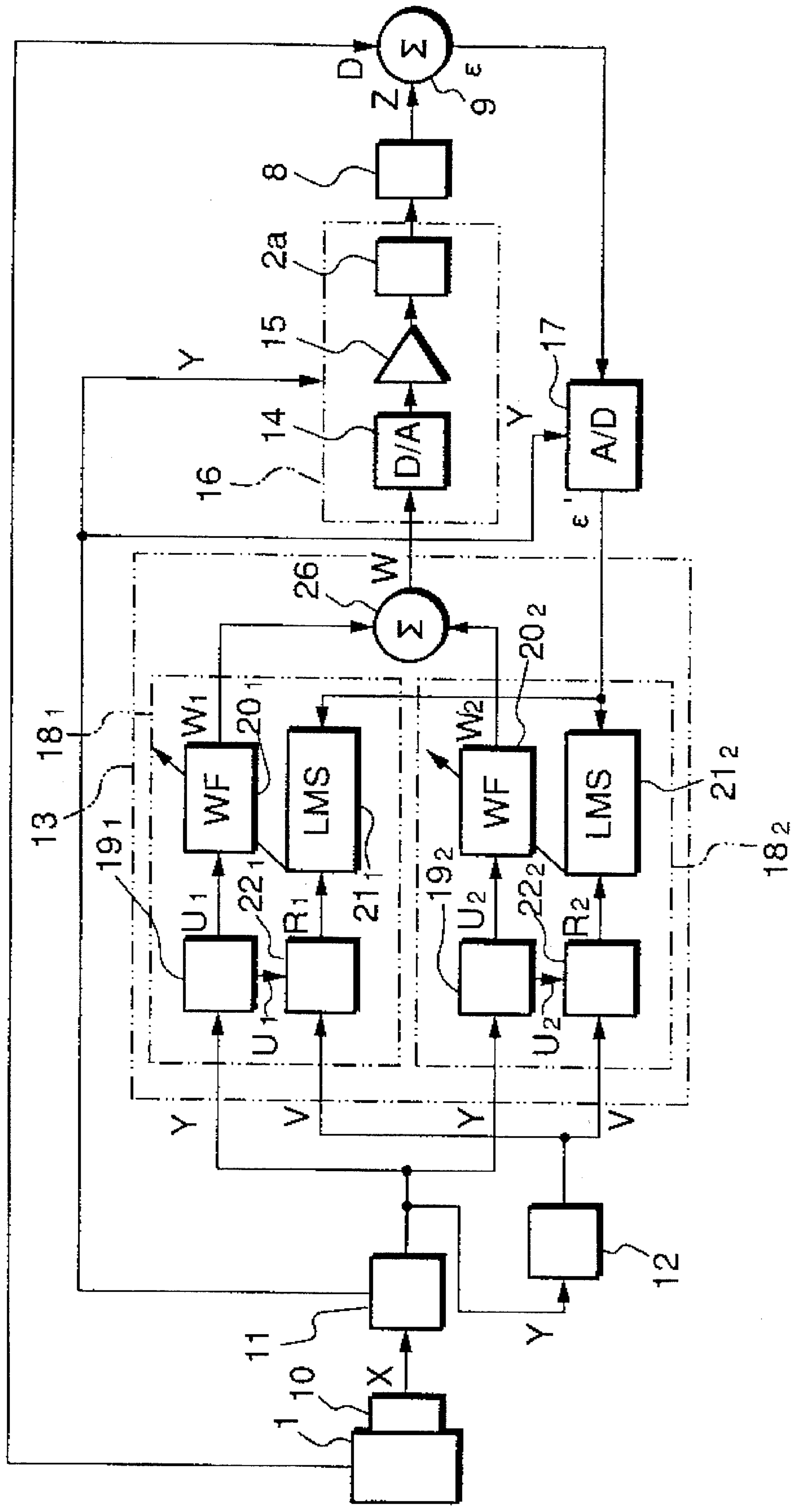
FIG. 2 is a block diagram showing the whole arrangement of a vibration/noise control system according to a first embodiment of the invention.

FIG. 2 shows the whole arrangement of the vibration/noise control system according to a first embodiment of the invention, which comprises the rotation sensor 10 for generating a rotation signal X indicative of the sensed rotation of the flywheel, a pulse signal-generating circuit 11 for generating a pulse signal Y by shaping the waveform of the rotation signal X output from the rotation sensor 10, an engine rotational speed (NE) sensor 12 for generating an NE signal V indicative of the rotational speed NE of the engine by measuring an interval $\Delta t$ of pulses of the pulse signal Y delivered from the pulse signal-generating circuit, a digital signal processor (hereinafter referred to as "the DSP") 13 which is supplied with the pulse signal Y from the pulse signal-generating circuit 11 and the NE signal V from the NE sensor 12 and is capable of making high-speed operation to perform adaptive control by generating a control signal W (of a digital type), a digital-to-analog converter 14 for converting the control signal W delivered from the DSP 13 into an analog signal, an amplifier 15 for amplifying the analog signal delivered from the digital-to-analog converter 14, and the self-expanding mount 2*a* as the electromechanical transducer, the chassis 8, the vibration error sensor 9, and an analog-to-digital converter 17 for converting the error signal (of an analog type) $\epsilon$ delivered from the vibration error sensor 9 into a digital signal. The digital-to-analog converter 14, the amplifier 15, and the self-expanding engine mount 2*a* is defined as a vibration/noise-transmitting path in the present specification.

More specifically, the rotation sensor 10 counts teeth of the ring gear of the flywheel to generate the rotation signal X whenever the flywheel rotates through a predetermined very small angle, e.g. 3.6°, and delivers the rotation signal X to the pulse signal-generating circuit 11. In this connection, the means for detecting the rotation of the engine is not limited to a sensor of the above-mentioned type adapted to count teeth of the ring gears of the flywheel, but an encoder and the like may be used for directly detecting the rotation of the crankshaft or camshaft and generating a signal indicative of the sensed rotation. However, when the rotation of the crankshaft is directly detected, variation in the rotation may be caused by torsional vibration and the like of the crankshaft. When the rotation of the camshaft is directly detected as well, the rotation of the camshaft can be varied, though to a slight degree, e.g. due to elongation of a timing belt connecting a pulley mounted on the camshaft and a pulley mounted on the crankshaft. In contrast, the flywheel, which is rigidly fixed to the crankshaft, has a large moment of inertia and hence suffers from little variation in its rotation. Therefore, the rotation signal X obtained by counting teeth of the ring gear is advantageous in that it can provide a desired sampling frequency in a relatively easy and very accurate manner.

The DSP 13 incorporates a plurality of types of adaptive control circuits (in the present embodiment, two types of adaptive control circuits $\mathbf{18}_1$, $\mathbf{18}_2$), and further the adaptive control circuits $\mathbf{18}_1$, $\mathbf{18}_2$ are each comprised of reference signal-generating circuits $\mathbf{19}_1$, $\mathbf{19}_2$ for generating different reference signals $U_1$, $U_2$ based on the pulse signal Y, Wiener filters $\mathbf{20}_1$, $\mathbf{20}_2$ (the first filter means, hereinafter referred to as "the W filters") as ADF's of a finite impulse response (FIR) type for filtering the reference signals $U_1$, $U_2$, least mean square (LMS) processors $\mathbf{21}_1$, $\mathbf{21}_2$ (control signal-updating means) for providing adaptive algorithm used in updating filter coefficients used in the W filters $\mathbf{20}_1$, $\mathbf{20}_2$, and correction filters (the second filter means, hereinafter referred to as "the C filters") $\mathbf{22}_1$, $\mathbf{22}_2$ for correcting changes in phase and amplitude of the control signal delivered from the DPS 13, caused by the transfer characteristic of the vibration/noise-transmitting path 16.

Figures 3A, 3B:
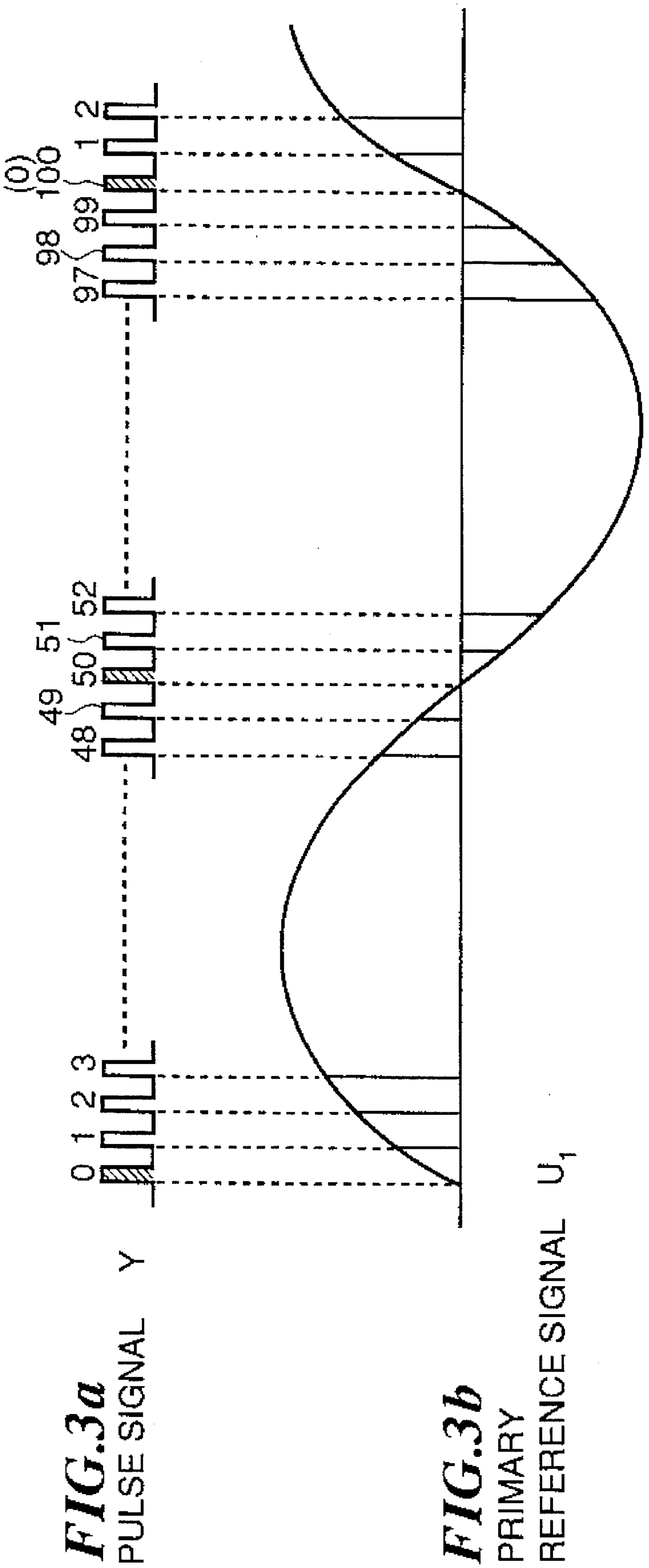
Figures 4A, 4B:
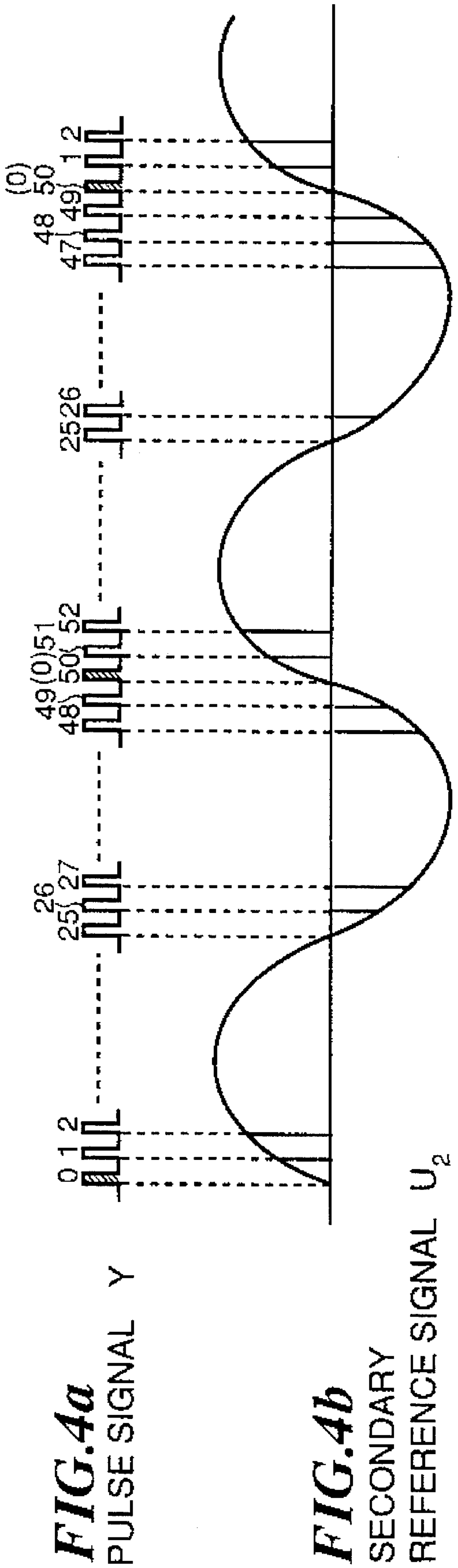

The reference signal-generating circuits $\mathbf{19}_1$, $\mathbf{19}_2$ generate sine wave signals corresponding to characteristics of vibrations and noises peculiar to component parts of the engine such as valve-operating devices, the crankshaft and parts associated therewith, and combustion chambers. The sine wave signals each have a single repetition period corresponding to a repetition period of vibrations and noises ascribed to component parts of the engine. More specifically, in the present embodiment, the reference signal-generating circuit $\mathbf{19}_1$ generates a reference signal $U_1$ (primary reference signal) suitable for controlling a vibration component (primary vibration component) having a regular vibration/noise characteristic, which is synchronous with the rotation of the engine, while the reference signal-generating circuit $\mathbf{19}_2$ generates a reference signal $U_2$ (secondary reference signal) suitable for controlling a vibration component (secondary vibration component) ascribed to explosion (excitation forces) having an irregular vibration/noise characteristic dependent on the state of combustion. Further specifically, the reference signal generating circuit $\mathbf{19}_1$ generates one cycle (repetition period) of a sine wave whenever the flywheel performs one rotation, while the reference signal-generating circuit $19_2$ generates one cycle (repetition period) of a sine wave whenever the flywheel performs half rotation. As shown in FIG. 3*a*, the reference signal-generating circuit $19_1$ is supplied with pulses of the pulse signal Y generated by the pulse signal-generating circuit 11 whenever the flywheel rotates through a very small angle, e.g. 3.6°. That is, during one rotation of the flywheel corresponding to one repetition period of the primary vibration component, 100 pulses are each sequentially input to address 0, address 1 . . . , address 99. The reference signal-generating circuit $19_1$ stores in advance values of a sine wave for respective very small angles, i.e. for the above-mentioned addresses, and whenever a pulse of the pulse signal Y is input to the reference signal-generating circuit $19_1$, a value of the primary reference signal $U_1$ corresponding to the input pulse of the pulse signal Y is delivered therefrom. FIG. 3*b* shows the primary reference signal (sine wave signal) formed in this manner by generating digital values indicative of one repetition period of a sine wave when the flywheel effects one rotation. The reference signal-generating circuit $19_2$ operates substantially in the same manner. As shown in FIG. 4*a*, during half rotation of the flywheel corresponding to one repetition period of the secondary vibration component, 50 pulses are each sequentially input to address 0, address 1 . . . , address 49. The reference signal-generating circuit $19_2$ stores in advance values of a sine wave for respective very small angles, i.e. for the addresses, and whenever a pulse of the pulse signal Y is input to the reference signal-generating circuit $19_2$, a value of the secondary reference signal $U_2$ corresponding to the input pulse of the pulse signal Y is delivered therefrom. FIG. 4*b* shows the secondary reference signal formed by generating digital values indicative of one repetition period of a sine wave when the flywheel performs half rotation, i.e. by those indicative of two repetition periods of the sine wave when the wheel performs one rotation.

Thus, by introducing the concept of the vibration order (primary vibration component, secondary vibration component, and so forth) and performing the adaptive control on each of a plurality of vibration orders (primary, secondary, . . . ) of the vibration components, it is possible to reduce the vibrations and noises more effectively. More specifically, the primary vibration component is related to vibrations which are regularly generated in synchronism with the rotation of the crankshaft and the like, and the adaptive control particularly directed to the primary vibration component can effectively reduce the vibrations and noises caused by the inertia of rotation of the engine and the like. Further, during two rotations of the crankshaft, one explosion stroke is performed per one cylinder, and with the four-cylinder engine, four explosions occur during two rotations of the crankshaft. Therefore, the secondary vibration component is related to the explosion occurring in each combustion chamber. The adaptive control separately performed on the secondary vibration component having irregular vibration/noise characteristics related to explosions and the primary vibration component having regular vibration/noise characteristics makes it possible to reduce the vibrations and noises more effectively.

Figure 5:
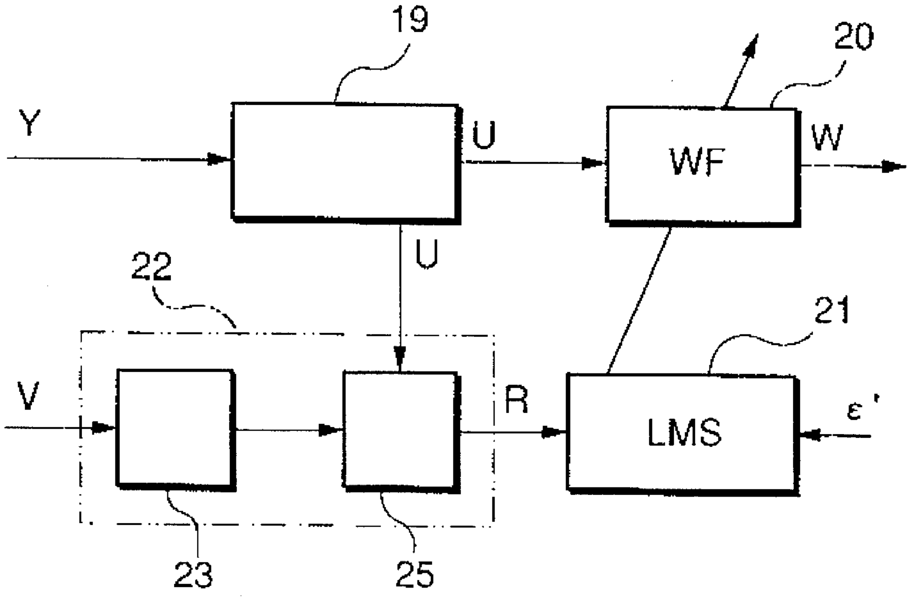
FIG. 5 is a block diagram showing details of an adaptive control circuit appearing in FIG. 2.

The C filter 22 is, as shown in FIG. 5, comprised of filter coefficient-selecting means 23 for selecting filter coefficients representative of the transfer characteristic (transfer function) of the vibration/noise-transmitting path based on the NE signal V delivered from the NE sensor 12, and transfer characteristic-dependent reference signal-forming means 25 for forming a transfer characteristic-dependent reference signal R by correcting the reference signal U based on the selected filter coefficients delivered from the filter coefficients-selecting means 23.

More specifically, the filter coefficient-selecting means 23 stores a filter coefficient table which is set, as to the vibrations and noises of an order to be controlled (primary or secondary vibration component), such that predetermined values of the filter coefficients KC are provided in a manner corresponding to predetermined values of the NE signal V (interval Δt of pulses of the pulse signal Y), and by retrieving the filter coefficient table, or additionally by interpolation, proper values of the filter coefficients corresponding to the NE signal V are selected. Then, the transfer characteristic-dependent reference signal-forming means 25 performs convolution (product-sum operation) of the reference signal U in the form of the sine wave and the filter coefficients KC, thereby correcting the reference signal U by the filter coefficients KC to produce the transfer characteristic-dependent reference signal R, which have been corrected in relation to phase and amplitude of the control signal according to the engine rotational speed NE. In short, the reference signal C is corrected by the filter coefficient KC selected according to the engine rotational speed NE, whereby the C filter 22 is allowed to identify or properly represent the transfer characteristic of the vibration/noise-transmitting path dependent on the engine rotational speed NE promptly and easily.

Thus, in the vibration/noise control system having the above construction, as shown in FIG. 2, the rotation signal X detected by the rotation sensor 10 is input to the pulse signal-generating circuit 11, and the pulse signal Y having its waveform properly shaped by the pulse signal-generating circuit 11 is input to the reference signal-generating circuits $19_1$, $19_2$, from which predetermined values of sine waves dependent on respective orders of vibration component (primary and secondary in the present embodiment) are sequentially delivered. More specifically, whenever a pulse of the pulse signal Y is input to the reference signal-generating circuits $19_1$, $19_2$, the reference signal-generating circuit $19_1$ generates the primary reference signal $U_1$ suitable for control of the primary vibration component, and the reference signal-generating circuit $19_2$ generates the secondary reference signal $U_2$ suitable for control of the secondary vibration component.

On the other hand, the pulse signal Y is also supplied to the NE sensor 12, from which the NE signal V is supplied to the C filters $22_1$, $22_2$. At the C filters $22_1$, $22_2$, the filter coefficients KC are selected according to the NE signal V, and then the product-sum operation (convolution) of the reference signals $U_1$, $U_2$ from the reference signal-generating circuits $19_1$, $19_2$ and respective ones of the filter coefficients KC are performed to take into account the transfer characteristic of the vibration/noise, transmitting path dependent on the order of vibrations and noises. The transfer characteristics thus identified of the vibration/noise-transmitting path are represented by the transfer characteristic-dependent reference signals $R_1$, $R_2$, which are delivered to the LMS processors $21_1$, $21_2$.

Further, the primary and secondary reference signals $U_1$, $U_2$ are filtered by the W filters $20_1$, $20_2$, and delivered therefrom as the control signals $W_2$, $W_2$, respectively. The control signals $W_1$, $W_2$ are added together by the adder 26. Then, the resulting control signal W output from the adder 26 is converted by the digital-to-analog converter 14 with the pulse signal Y as a trigger, into an analog signal. The analog signal is amplified by the amplifier 15, and then transmitted from the self-expanding engine mounts 2*a* supported by the chassis 8 to the vibration error sensor 9 as a component of movement detected by the error sensor 9 i.e. as a driving signal Z.

On the other hand, a vibration/noise signal (vibrations and noises, per se) D of the engine 1 as the vibration/noise source is also supplied to (i.e. moves) the vibration error sensor 9 as a component of the movement detected thereby. In other words, the driving signal Z (movement of the engine mount 2*a*) and the vibration/noise signal D (vibrations and noises of the engine) are actually cancelled each other to form an error indicative of the difference therebetween, which is detected by the error sensor 9 as the error signal ε. Then, conversely to the case of the digital-to-analog converter 14, the error signal ε is sampled by the analog-to-digital converter 19 with the pulse signal Y delivered from the pulse signal-generating circuit 11, as a trigger, into a digital signal (error signal ε'). The resulting error signal ε' is input to the LMS processors $\mathbf{21}_1$, $\mathbf{21}_2$, which update the filter coefficients of the W filters $\mathbf{20}_1$, $\mathbf{20}_2$ based on the transfer characteristic-dependent reference signals $R_1$, $R_2$ from the C filters $\mathbf{22}_1$, $\mathbf{22}_2$, the error signal ε', the reference signals $U_1$, $U_2$, and the present filter coefficients of the W filters $\mathbf{20}_1$, $\mathbf{20}_2$, whereby the W filters $\mathbf{20}_1$, $\mathbf{20}_2$ deliver the new control signals $W_1$, $W_2$ to thus execute the adaptive control of vibrations and noises.

In the vibration/noise control system described above, the reference signals U delivered from the reference signal-generating circuits 19 are each formed of a sine wave having a single repetition period per one repetition period of the vibration components of an order (primary or secondary) to be controlled. Therefore, the W filters 20 are not supplied with superfluous frequency information, and hence the tap length (number of filter coefficients) of the W filter 20 can be relatively small (the smallest possible number of taps is two), whereby it is possible to reduce the operation time of the product-sum operation (convolution) to attain an enhanced converging speed of the control.

Further, since the reference signal U is formed of a sine wave, it is not required to store frequency characteristics having a high order related to the transfer characteristics of the vibration/noise-transmitting path or use a filter having a long tap length, Therefore, it is not required to store in advance data related to transfer characteristics of the path by the use of a lot of storage elements. That is, the filter coefficients KC dependent on the engine rotational speed NE related to a predetermined order of vibration components to be controlled are stored in the filter coefficient-selecting means 23 in advance, and at the same time proper values of the filter coefficients KC are selected according to the engine rotational speed NE, whereby the reference signal U is corrected by the filter coefficients KC, which makes it possible to generate a transfer characteristic-dependent reference signal R which has been corrected of errors in respect of amplitude and phase of the control signal resulting from variation in the engine rotational speed NE. This makes it possible to easily identify the transfer characteristic of the vibration/noise-transmitting path, and simplify the system.

Further, according to the first embodiment, errors in amplitude of the control signal caused by the transfer characteristic of the vibration/noise-transmitting path 16 can be fairly rapidly absorbed by the W filter 20, so that filter coefficients KC stored in the filter coefficients-selecting means 23 can be restricted to those for errors in phase, which makes it possible to further simplify the system. In this connection, the filter coefficients KC are preferably variable with other operating parameters of the engine, such as the engine coolant temperature.

Figure 6:
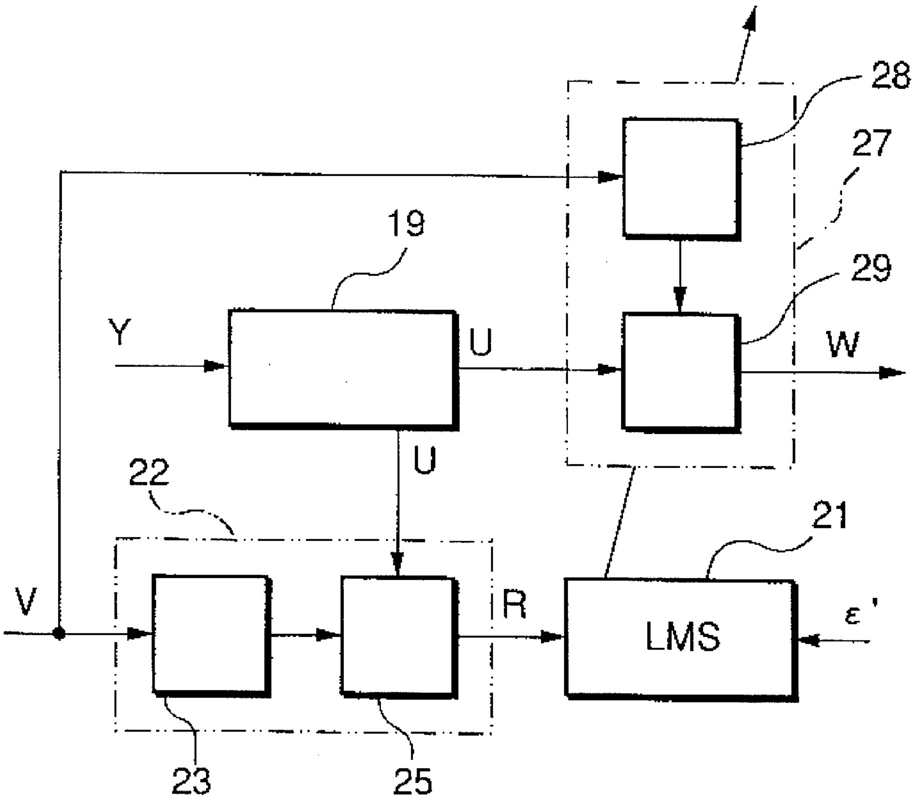
FIG. 6 is a block diagram showing a variation of the FIG. 5 adaptive control circuit.

FIG. 6 shows a variation of the adaptive control circuit described above, in which the W filter 27 is constructed substantially in the same manner as the C filter 22. More specifically, in this variation, the W filter 27 is comprised of filter coefficient-selecting means 28 for selecting filter coefficients KW for use in the W filter 27 depending or variation in the NE signal V delivered from the NE sensor 12, and control signal-forming means 29 for correcting the reference signal U based on the filter coefficients to form the control signal W.

More specifically, the filter coefficient-selecting means 28 stores in advance filter coefficients $KW_1$ corresponding to an interval Δt of pulses of the pulse signal Y and at the same time the newest filter coefficients $KW_2$ updated by the LMS processor 21 and depending on the engine rotational speed NE, the filter coefficients $\Delta W_1$ or $\Delta W_2$ are selected.

More specifically, when the engine rotational speed changes drastically, the adaptive control can be delayed in follow-up. According to the above variation, however, the filter coefficient-selecting means 28 stores the newest filter coefficients $\Delta W_2$ updated by the LMS processor 21, besides the filter coefficients $\Delta W_1$ dependent on the interval Δt of pulses of the pulse signal Y. Depending on variation in the NE signal V indicative of the engine rotational speed, the filter coefficients $\Delta W_1$ or $\Delta W_2$ are properly or suitably selected, based on which the reference signal U is corrected to generate the control signal W. This makes it possible to obtain the control signal W as desired even if the engine rotational speed has changed suddenly, permitting the adaptive control to follow up a change in the rotation of the engine rotational speed thereby enhancing the accuracy of the adaptive control. In other words, when the engine rotational speed NE does not drastically change, the coefficient values $\Delta W_2$ are selected, and hence the control signal W is formed by correcting the reference signal U by the use of correction coefficients updated based on the immediately preceding value of the filter coefficients applied while taking the transfer characteristic of the vibration/noise-transmitting path into account, whereas if the engine rotational speed NE has changed suddenly, the filter coefficients $\Delta W_1$ corresponding to the interval Δt of pulses of the pulse signal Y are selected. This makes it possible to prevent the converging speed from being degraded as much as possible, even if the engine rotational speed has changed suddenly, permitting the vibration/noise control with excellent follow-up capability.

Figure 7:
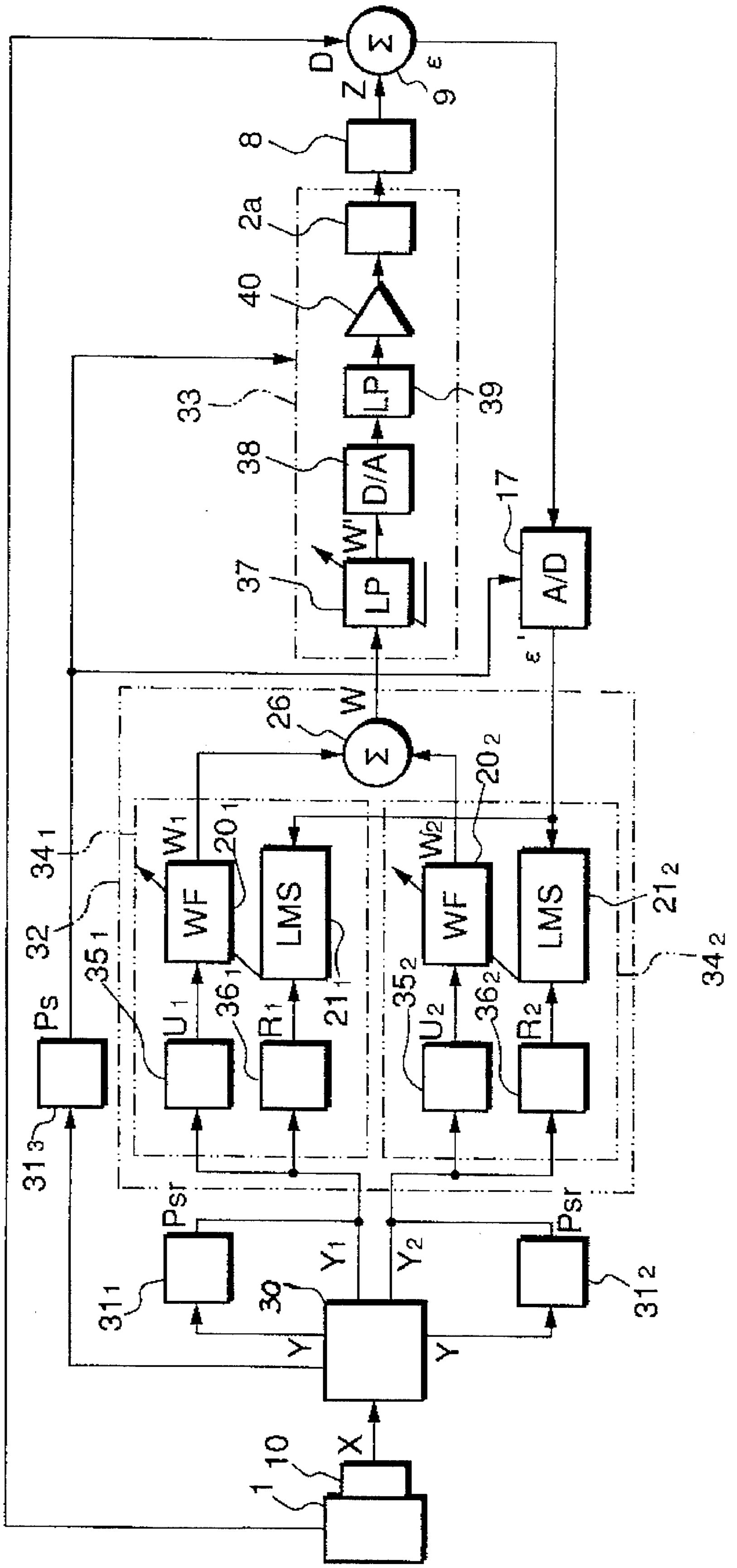
FIG. 7 is a block diagram showing the whole arrangement of a vibration/noise control system according to a second embodiment of the invention.

FIG. 7 shows the whole arrangement of a vibration/noise control system according to a second embodiment of the invention, in which a delay φ in phase of the control signal caused by the vibration/noise-transmitting path extending from the adaptive control circuit to the error sensor is particularly taken into consideration.

In the vibration/noise control system of this embodiment, the rotation signal X delivered from the rotation sensor 10 is supplied to an electronic control unit (hereinafter referred to as the "ECU") 30 for controlling operating conditions of the engine, and at the same time, the system includes first to third frequency divider circuits $\mathbf{31}_1$ to $\mathbf{31}_3$ for frequency-dividing timing pulse signals Y delivered from the ECU 30 and a driving frequency pulse signal of the ECU 30, respectively More specifically, a DSP 32 is driven by variable sampling pulse signals (divisional signals) Psr obtained by the first and second frequency-dividers $\mathbf{31}_1$ and $\mathbf{31}_2$ for frequency-dividing the respective timing pulse signals $Y_1$ and $Y_2$ respectively corresponding to the primary and secondary vibration components, such that each of repetition periods of the timing pulse signals $Y_1$ and $Y_2$ corresponding to the respective repetition periods of the primary and secondary vibration components is divided by four pulses. In this connection, the timing pulse signal $Y_2$ has a frequency two times as high as the timing pulse signal $Y_1$. A vibration/noise-transmitting path 33, the vibration error sensor 9, and the analog-to-digital converter 17 are controlled in respect of driving thereof by a fixed sampling pulse signal Ps having fixed sampling frequency Fs (e.g. 10 KHz) formed by frequency-dividing the driving frequency pulse signal of the ECU 30 having the driving frequency (e.g. 20 MHz).

The DSP 32 includes two kinds of adaptive control circuits $\mathbf{34}_1$, $\mathbf{34}_2$, similarly to the first embodiment. The adaptive control circuit $\mathbf{34}_1$ is comprised of the W filter $\mathbf{20}_1$, the LMS processor $\mathbf{21}_1$, the reference signal-generating circuit $\mathbf{35}_1$ for generating the reference signal in synchronism with inputting of pulses of the variable sampling pulse signal Psr output from the first frequency-divider circuit $\mathbf{31}_1$, and the C filter $\mathbf{36}_1$ for correcting variation in phase and amplitude of the control signal caused by the vibration/noise-transmitting path 33, and the adaptive control circuit $\mathbf{34}_2$ is comprised of the W filters $\mathbf{20}_2$, the LMS processor $\mathbf{21}_2$, the reference signal-generating circuits $\mathbf{35}_2$ for generating the reference signal in synchronism with inputting of pulses of the variable sampling pulse signal Psr output from the second frequency-divider circuit $\mathbf{31}_2$, and the C filter $\mathbf{36}_2$ for correcting variation in phase and amplitude of the control signal caused by the vibration/noise-transmitting path 33.

As shown in FIG. 8*a* and FIG. 8*b*, the reference signal-generating circuit $\mathbf{35}_1$ is supplied with the variable sampling pulse Psr formed by frequency-dividing the timing pulse signal $Y_1$ by the use of the first frequency divider circuit $\mathbf{31}_1$. The reference signal-generating circuit $\mathbf{34}_1$ stores in advance digital values indicative of a sine wave corresponding to a sequence of pulses of the variable sampling pulse signal Psr input thereto, and whenever the flywheel performs one rotation corresponding to one repetition period of the primary vibration component, digital values indicative of one repetition period of the sine wave, i.e. four digital values indicative of the sine wave are delivered therefrom. As shown in FIG. 8*c* and FIG. 8*d*, the reference signal-generating circuit $\mathbf{35}_2$ operates in the same manner. That is, this circuit is supplied with the variable sampling pulse signal Psr formed by frequency-dividing the timing pulse signal $Y_2$ by the use of the second frequency divider circuit $\mathbf{31}_2$. Then, digital values indicative of one repletion period of a sine wave are delivered therefrom whenever the flywheel undergoes half rotation corresponding to one repetition period of the secondary vibration component. Therefore, for one rotation of the flywheel, two repetition periods of digital values, i.e. eight digital values, indicative of the sine wave, are delivered therefrom.

Thus, the present embodiment, which is also based on the concept of the order of vibration components introduced into the present invention as described above, performs the adaptive control by classifying the vibration components into a plurality of orders, thereby attaining effective reduction of vibrations and noises.

As shown in FIG. 7, the vibration/noise-transmitting path 33 is comprised of a variable low-pass filter 37 (cut-off frequency Fc=Fsr/2) for removing or attenuating a predetermined high-frequency range of the control signal W, a digital-to-analog converter 38 for converting the control signal W', filtered by the variable low-pass filter 37, into an analog signal, a fixed low-pass filter 39 (cut-off frequency Fc=Fs/2) for smoothing the analog signal (rectangular wave signal) output from the digital-to-analog converter 38, an amplifier 40, and the above-mentioned self-expanding engine mount 2*a*.

Figure 9:
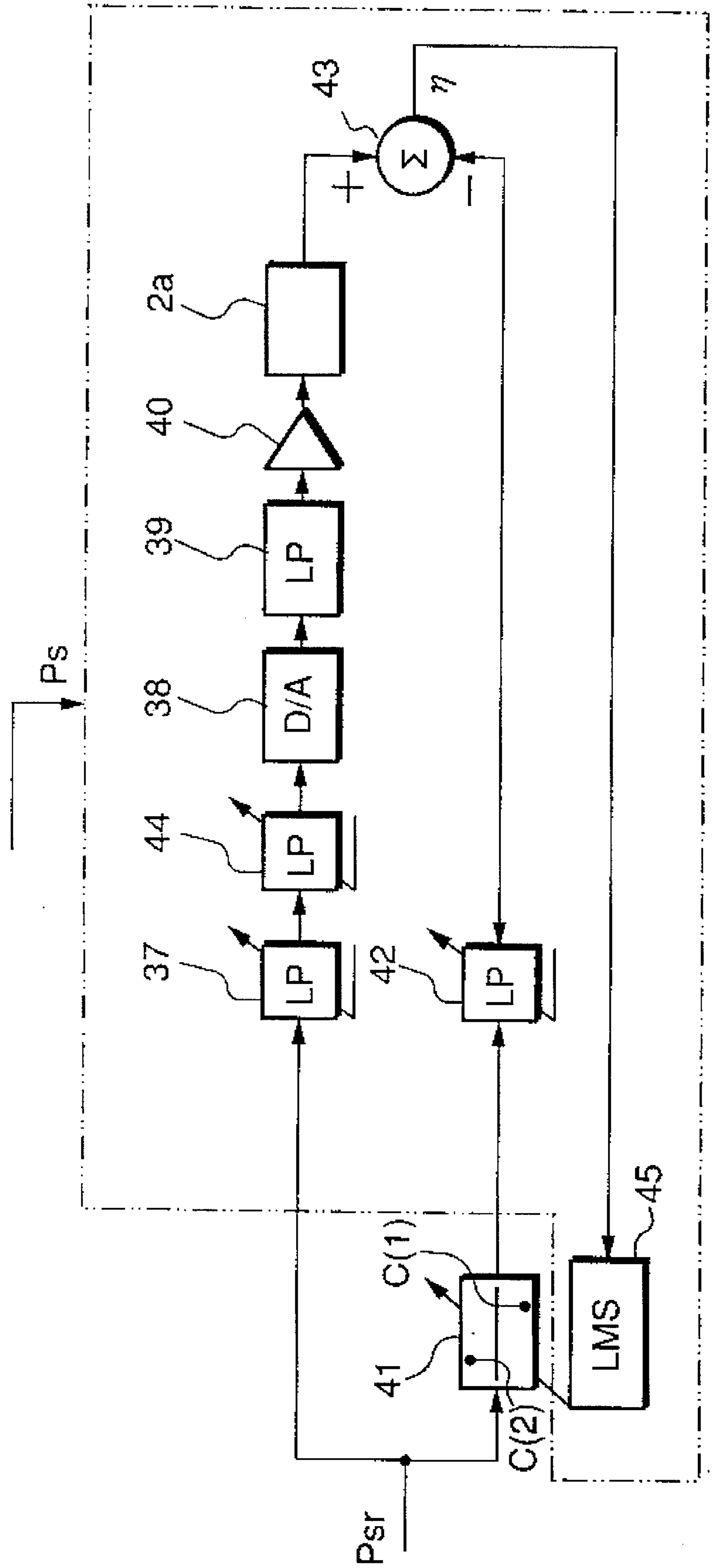
FIG. 9 is a block diagram which is useful in explaining a manner of identifying a transfer characteristic of a vibration/noise-transmitting path.

Further, the C filter 36 stores, as shown in FIG. 9, filter coefficients C(1), C(2) of an adaptive digital filter 41 (hereinafter referred to as "fixing filter") having two taps (filter coefficients) set or identified in advance in a manner corresponding to the variable sampling pulse signal Psr generated according to the engine rotational speed NE, and formed into a table.

That is, such filter coefficients C(1) and C(2) are experimentally determined for a vibration/noise-transmitting path to which the present system is expected to actually supply the control signal and stored in the C filter 36. A manner of setting or identifying, the filter coefficients of the C filter 36 will be described in detail with reference to FIG. 9.

First, a variable sampling pulse signal Psr generated according to the engine rotational speed NE is input to a filter 41 for identifying the transfer characteristic (transfer function) of a vibration/noise,transmitting path and a variable low-pass filter 37. High-frequency components of an output signal from the filter 41 are cut off by a variable low-pass filter (cut-off frequency Fc=Fsr/2) 42 for identifying the transfer characteristic to thereby form a desired sine wave signal, which is delivered to an adder 43.

On the other hand, a compensating variable low-pass filter 44 (cut-off frequency Fc=Fsr/2) is interposed between the variable low-pass filter 37 and the digital-to-analog converter 38 for identifying the transfer characteristic (transfer function) of the vibration/noise-transmitting path. The compensating low-pass filter 44 is provided so as to compensate for provision of the variable low-pass filter 42 between the filter 41 and the adder 43. Then, an output signal from the variable low-pass filter 37 passes through the compensating variable low-pass filter 44, the digital-to-analog converter 38, the fixed low-pass filter 39, the amplifier 40, and the self-expanding engine mount 2*a*, thus being formed into a smooth sine wave, which is input to the adder 43. The adder 43 delivers a cancellation signal $\eta$ as a result of cancellation of the output signal from the self-expanding engine mount 2*a* and an output signal from the fixed variable low-pass filter 42. The cancellation signal $\eta$ is supplied to the LMS processor 45, and then, the filter coefficients C(1), C(2) of the filter 41 are determined such that the square $\eta^2$ of the cancellation signal $\eta$ becomes equal to "0". The cut-off frequencies Fc of the variable low-pass filter 37, the variable low-pass filter 42, and the compensating variable low-pass filter 44 are updated according to the variable sampling frequency Fsr which would be actually set the rotation of the engine, and at the same time the filter coefficients C(1) and C(2) of the filter 41 are sequentially updated according to the variable sampling frequency Fsr. The filter coefficients C(1), C(2) set in a manner corresponding to values of the variable sampling frequency Fsr are formed into the above-mentioned table for storage in the C filter 36.

As shown in FIG. 7, in the vibration/noise control system having the above construction, the rotation signal X generated by the rotation sensor 10 is delivered to the ECU 30, from which the timing pulse signal $Y_1$ corresponding to a repetition period of vibrations and noises peculiar to some component parts of the engine is delivered to the reference signal-generating circuit $\mathbf{35}_1$, and the C filter $\mathbf{36}_1$, and the timing pulse signal $Y_2$ corresponding to a repetition period of vibrations and noises peculiar to other component parts of the engine is delivered to the reference signal-generating circuit $\mathbf{35}_1$, and the C filter $\mathbf{36}_2$. On the other hand, the first frequency divider circuit $\mathbf{31}_1$ forms the variable sampling pulse signal (divisional signal) Psr by frequency-dividing the timing pulse signal $Y_1$ based on the pulses of the rotation signal X delivered from the rotation sensor 10 such that one repetition period of the divisional signal is formed by four pulses, and the second frequency divider circuit $31_2$ forms the variable sampling pulse signal Psr by frequency-dividing the timing pulse signal $Y_2$ based on the pulses of the rotation signal X delivered from the rotation sensor 10 such that one repetition period of the divisional signal is formed by four pulses. Whenever the variable sampling pulses (divisional signals) Psr are supplied to the reference signal-generating circuits $35_1$, $35_2$, predetermined values indicative of sine waves are delivered therefrom. More specifically, the reference signal-generating circuit $35_1$ generates the primary reference signal $U_1$ suitable for control of the primary vibration component, while the reference signal-generating circuit $35_2$ generates the secondary reference signal $U_2$ suitable for control of the secondary vibration component.

Then, the primary and secondary reference signals $U_1$, $U_2$ are filtered by the W filters $20_1$, $20_2$ and delivered therefrom as the control signals $W_1$, $W_2$, respectively. The control signals $W_1$, $W_2$ are added together by the adder 26, and the resulting control signal W is supplied to the vibration/noise-transmitting path 33 and then input into the error sensor 9 as the driving signal Z i.e. as a component of movement detected thereby.

The vibration/noise-transmitting path 33 is driven under the control of the fixed sampling pulse Ps formed by frequency-dividing the driving frequency pulse signal of the ECU 30 having the driving frequency (e.g. 20 MHz) by means of the third frequency divider circuit $31_3$. More specifically, the control signal W is input to the variable low-pass filter 37 having a sampling frequency updated according to the repetition period ($\tau=(1/Fsr)$) of variable sampling pulse signal Psr. The cut-off frequency of the variable low-pass filter 37 is varied for the following reason: When the digital processing is performed by the variable sampling pulse signal Psr generated based on the engine rotational speed, it is required to cut off high-frequency components by the use of a low-pass filter, since harmonic frequency components outside the object of control may be generated due to the characteristics of the vibration/noise-transmitting path. However, the cut-off frequency Fc is set to approximately ½ of a normal frequency band. Therefore, when the engine rotational speed is e.g. 600 rpm (10 Hz in terms of frequency of the primary frequency component), the cutoff frequency Fc is equal to 20 Hz, whereas when the engine rotational speed is e.g. 6000 rpm, the cut-off frequency is equal to 200 Hz. Thus, there is a large variation in the frequency region to be cut off, so that it is impossible or disadvantageous to set the cut-off frequency to a fixed value. Therefore, according to the present invention, the cut-off frequency Fc of the control signal W is updated according to a repetition period (variable sampling period $\tau$) of the variable sampling pulse Psr dependent on the engine rotational speed.

Then, the control signal W' (digital signal) having passed through the variable low-pass filter 37 is converted into an analog signal by the digital-to-analog converter 38, and then smoothed by the fixed low-pass filter 39 having the predetermined cut-off frequency Fc. The resulting smooth signal is supplied through the amplifier 40 and the self-expanding engine mount 2a supported by the chassis 8 to the vibration error sensor 9 to be detected as the driving signal Z, i.e. determine the movement thereof.

On the other hand, the vibration/noise signal (i.e. vibration and noises per se) D of the engine 1 as the vibration/noise source is also input to the error sensor 9, i.e. also determines the movement thereof. In other words, the driving signal Z and the vibration/noise signal D are cancelled with each other, to form the error signal s, which is detected by the error sensor 9 and then delivered therefrom to the analog-to-digital converter 17 for conversion into a digital signal (error signal $\epsilon'$). The digital error signal $\epsilon'$ is input to the LMP processors $21_1$, $21_2$. The LMS processors $21_1$, $21_2$ updates the filter coefficients of the W filters $20_1$, $20_2$ based on the transfer characteristic-dependent reference signals $R_1$, $R_2$ representative of transfer characteristics of the vibration/noise-transmitting path stored in the C filters $36_1$, $36_2$ which are determined in advance as described above, the digital error signal $\epsilon'$, the reference signals $U_1$, $U_2$, and the present values of the filter coefficients of the W filters $20_1$, $20_2$, respectively, whereby the updated control signals $W_1$, $W_2$ are delivered from the W filters $20_1$, $20_2$, respectively, performing the adaptive control of vibrations and noises.

Figures 10A, 10B:
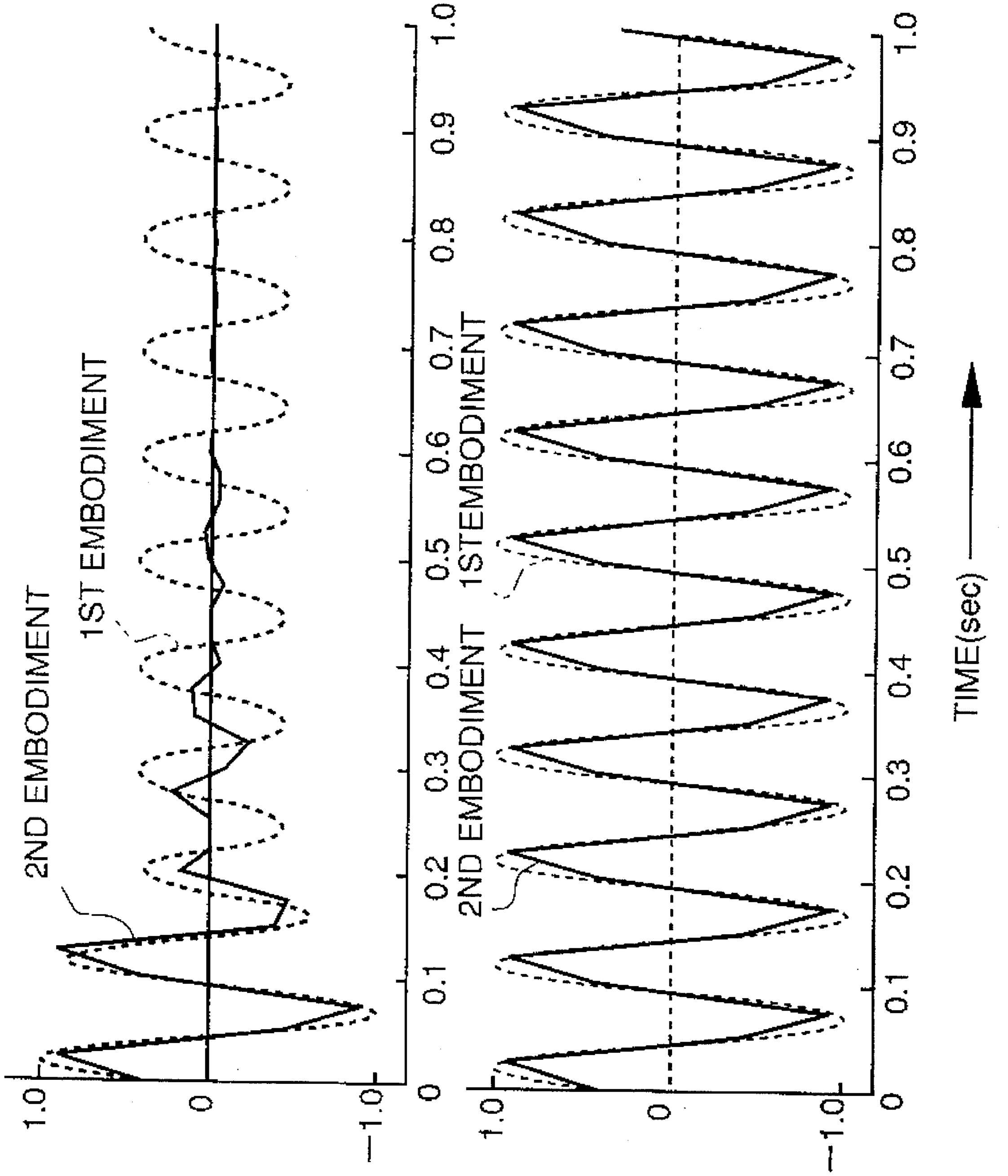

FIG. 10a and FIG. 10b show examples of convergence of the adaptive control exhibited by the present embodiment after it is started, in comparison with the first embodiment, in which the number N of pulses of the variable sampling pulse signal (divisional signal) Psr per one repetition period of the primary vibration component is 100. In the figures, the abscissa represents time (sec) while the ordinate represents amplitude. The solid lines indicate waveforms of error signals detected by the error sensor 9 after vibrations and noises are subjected to the adaptive control of the second embodiment, while the broken lines indicate waveforms of error signals detected after vibrations and noises are subjected to the adaptive control of the first embodiment. A delay $\phi$ in phase occurring with the control signal caused by the vibration/noise-transmitting path is 0.05 (sec) in terms of time. FIG. 10a shows changes in the amplitude of the error signal with the lapse of time after the adaptive control is started, while FIG. 10b shows changes in same when the adaptive control is not performed.

As is clear from FIG. 10a, according to the first embodiment, the amplitude of the signal is significantly decreased in about 0.2 seconds after the start of the adaptive control but ceases to be decreased thereafter, whereas according to the second embodiment, the amplitude continues to be drastically decreased thereafter as well, until it is reduced to almost 0 when 0.6 seconds have elapsed after the start of the adaptive control. This clearly shows a much higher convergence of the adaptive control attained by the second embodiment, compared with that of the first embodiment.

In the case of the first embodiment, the convergence of the adaptive control is degraded when taking a delay in phase of the control signal into consideration. However, when the W filter having two taps is used for the adaptive control, as in the case of the second embodiment, the reference signal U delivered from the reference signal-generating circuit 35 is formed of values constituting a sine wave obtained by dividing one repetition period of the vibration component having the order to be controlled (primary or secondary vibration component) by 4, which makes it possible to avoid degradation of convergence due to delay $\phi$ in phase.

More specifically, in the second embodiment, the degradation of convergence due to delay $\phi$ in phase can be avoided by the following reason:

The W filter is supplied with a sine wave, whereby the phase and amplitude thereof can be changed as desired. The input signal S(n) can be expressed by discrete representation of Equation (1):

$$S(n) = \sin kn$$

-continued $$= Im(e^{jkn}) \quad (1)$$

where n represents a discrete time signal, and k=2π/N. Im represents an imaginary part. If the imaginary part is omitted for the convenience sake, the input signal S(n) is expressed by Equation (2):

$$S(n)=e^{jkn} \quad (2)$$

Further, the input signal S'(n) delayed in phase by φ relative to the input signal S(n) is expressed by Equation (3):

$$S'(n)=e^{j(kn+\phi)} \quad (3)$$

On the other hand, the input signal S'(n) is subjected to the adaptive control by the W filter having the two taps (i.e. filter coefficients), and hence assuming that a first filter coefficient of the W filter is represented by T(1), and a second filter coefficient of same by T(2), the input signal S'(n) is expressed by Equation (4):

$$S'(n)=T(1)\times S(n)+T(2)\times S(n-1) \quad (4)$$

Therefore, by substitution of Equations (2) and (3) in Equation (4), the following Equation (5) is obtained, and further from Equation (5), Equation (6) is obtained.

$$e^{j(kn+\phi)} = T(1)\times e^{jkn} + T(2)\times e^{jk(n-1)} \quad (5)$$

$$\begin{aligned} e^{j\phi} &= T(1)+T(2)\times e^{-jk} \\ &= (T(1)+T(2)\cos k)-jT(2)\sin k \end{aligned} \quad (6)$$

Equation (6) represents the relationship between the first and second filter coefficients T(1) and T(2) of the W filter having a delay φ in phase relative to the input signal S(n), and k (=(2π/N)). Conditions of amplitude of the control signal determined by the first and second filter coefficients T(1) and T(2) form a elliptic locus on a T plane as can be understood from Equation (7), shown below, while conditions of phase form a linear locus as can be understood from Equation (8), shown below.

$$(T(1)+T(2)\cos k)^2+T(2)^2\sin^2 k=1 \quad (7)$$

$$\tan\phi=-T(2)\sin k/(T(1)+T(2)\cos k) \quad (8)$$

Therefore, the first and second filter coefficients T(1) and T(2) can be obtained by solving Equations (7) and (8) for T(1) and T(2), results of which are shown in Equations (9) and (10):

$$T(1)=\cos\phi+(\sin\phi/\tan k) \quad (9)$$

$$T(2)=-(\sin\phi/\sin k) \quad (10)$$

When the number N of pulses of the divisional signal is very large, it can be approximated as N→∞, and hence the value of k (= 2π/N) can be approximated as k→0. That is, a delay φ in phase occurs, the filter coefficients T(1) and T(2) in Equations (9) and (10) can be expressed as in Equations (11) and (12):

$$If\ 0<\phi<\pi,\ [T(1), T(2)]=[+\infty,-\infty9 \quad (11)$$

$$If -\pi<\phi<0,\ [T(1), T(2)]=[-\infty, +\infty] \quad (12)$$

On the other hand, if in Equations (7) and (8), the approximation of k–0 is effected, the conditions of amplitude are represented by Equation (13), and the conditions of Equation (14) are represented by Equation (14):

$$T(2)=\pm 1-T(1) \quad (13)$$

$$\phi=0, \pm\pi \quad (14)$$

Figure 11:
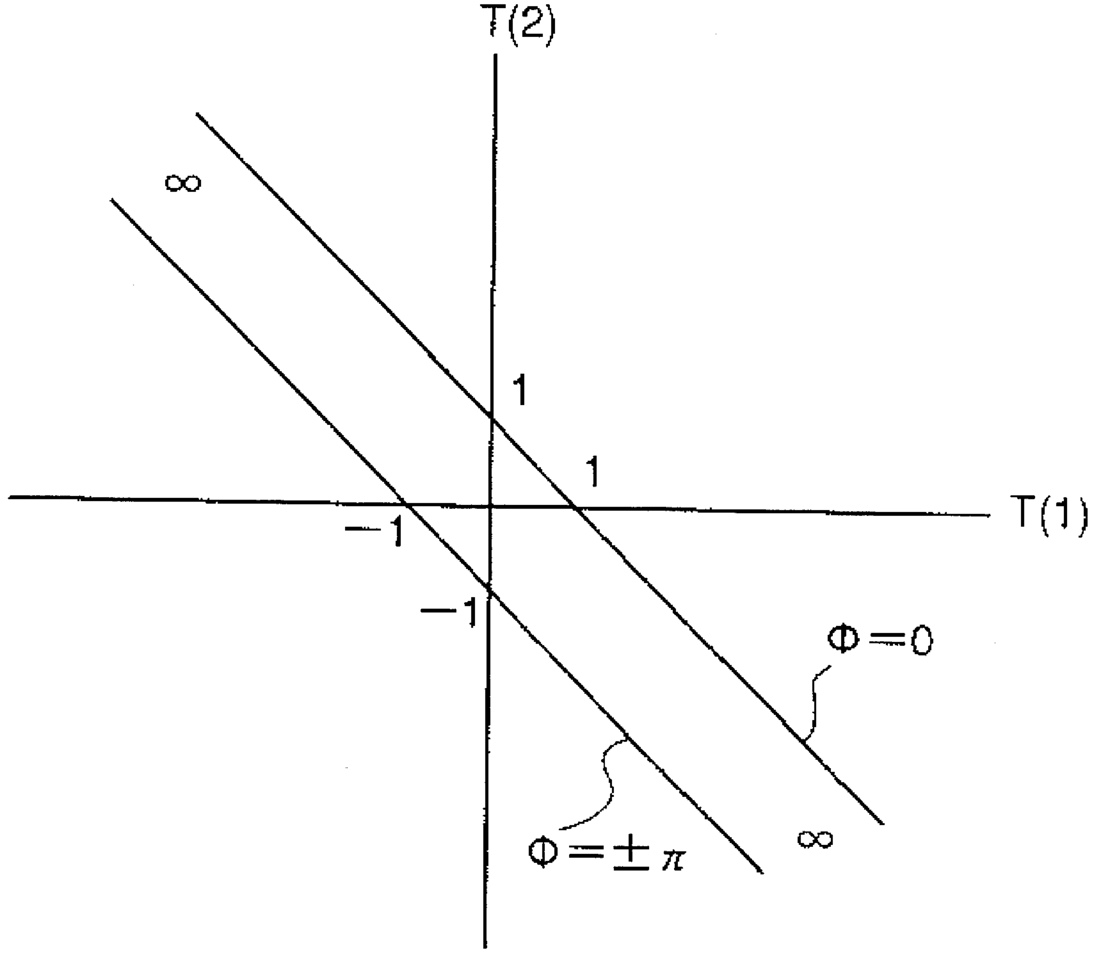
FIG. 11 is a diagram showing the relationship between a first filter coefficient T (1) and a second filter coefficient T (2) of a W filter.

Therefore, from Equations (13) and (14), the relationship between the first filter coefficients T(1) and the second filter coefficients T(2) can be depicted as shown in FIG. 11.

As is clear from FIG. 11, in the range of 0≦T(1)≦1, on a line of T(2)=1−T(1), the delay φ in phase is always equal to 0, and the input signal S(n) is not shifted in phase at all. In the range of −1≦T(1)≦0, on a line of T(2)=−1−T(1), the delay φ in phase is always equal to ±π. However, if there occurs even a slight deviation form "0" or "±π" with the delay φ in phase, the filter coefficients T(1), T(2) become infinite on the quadrants II and IV to be diverged.

This means that when the number N of pulses of the divisional signal becomes large, even a slight delay in phase makes it difficult to converge the first and second filters T(1) and T(2).

More specifically, in the first embodiment, a desired sine wave is obtained by lots of pulses occurring whenever the engine undergoes a very small angle of rotation, the number N of pulses of the pulse signal (divisional signal) becomes very large (e.g. 100). Taking the above-mentioned delay φ in phase into consideration, the convergence of the control of the first embodiment becomes very poor as shown in FIG. 11. More specifically, in an actual situation in which the vibrations and noises of an automotive vehicle and the like are to be actively controlled, there inevitably occurs the delay φ in phase caused by the vibration/noise-transmitting path extending from the adaptive control circuit to the error sensor, and hence the convergence thereof becomes degraded. In other words, it is considered that there exists some optimum range for the number N of pulses of the sampling pulse signal (divisional signal). Discussions will be made on this point below.

Figure 12A:
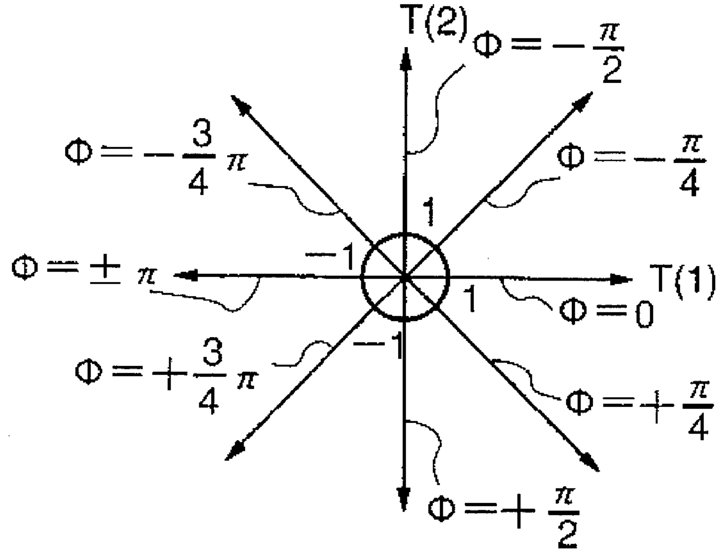
FIG. 12*a* to FIG. 12*c* are diagrams which are useful in explaining the reason for defining a range of the number N of pulses of a division signal per one repetition period of a timing pulse signal (i.e. repetition period of vibrations and noises) generated in the second embodiment.
Figure 12B:
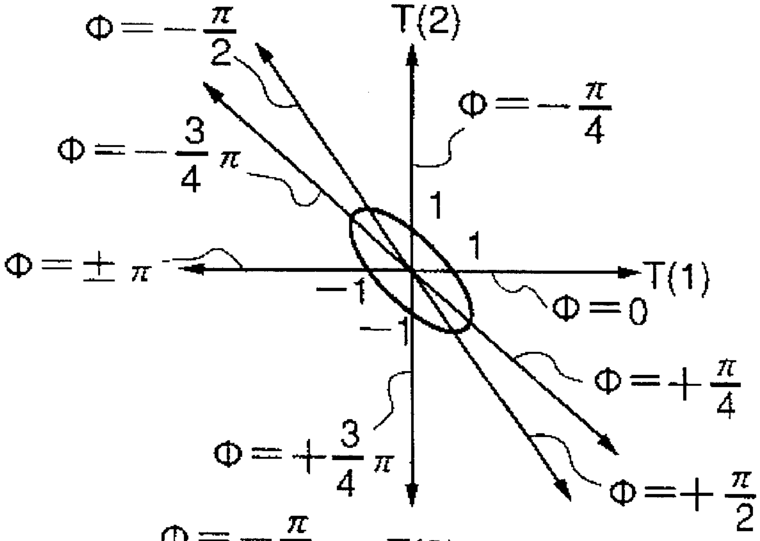
Figure 12C:
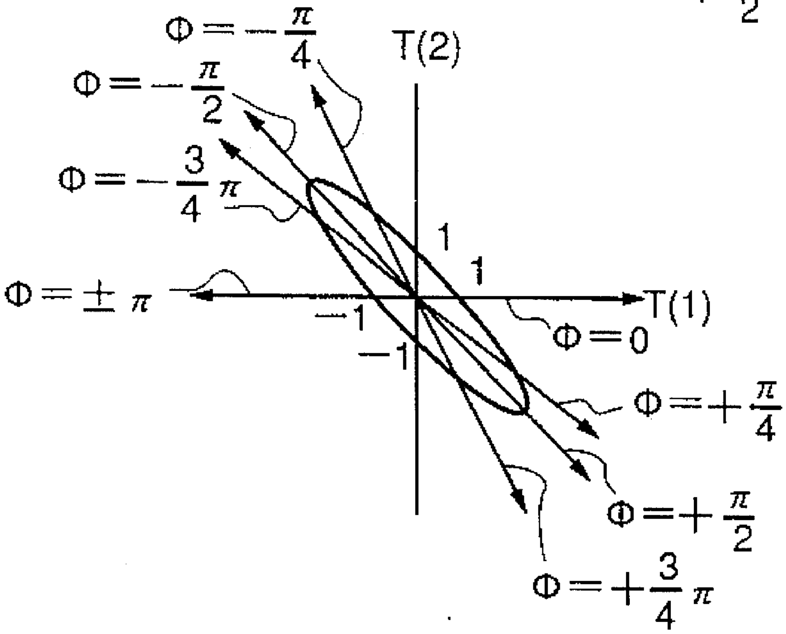

FIG. 12*s* to FIG. 2*c* show relationships between the number N and equi-amplitude ellipsis and equi-phase straight line (delay φ in phase=0, ±π/4, ±π/2, ±π¾, ±π). The abscissa represents the first filter coefficient T(1) and the ordinate the second filter coefficient T(2). FIG. 12*a* to FIG. 12*c* show cases of the number N being equal to 4, 8, and 16, respectively.

As is clear from FIG. 12*a* to FIG. 12*c*, the locus of the equi-amplitude ellipse forms a perfect circle when the number N is equal to 4. On the other hand, when the number N becomes larger than 4, the locus forms a ellipse having a major axis extending in the quadrant II and the quadrant IV. The ratio of the major axis to the minor axis becomes larger as the number N increases. Although depiction in the drawings is omitted, when the number N becomes smaller than 4, an ellipse having a major axis extending in the quadrant I and the quadrant III is formed.

On the other hand, with respect to the locus of the equi-phase straight line, when the delay φ in delay is always equal to "0" or + "π", and hence there is no actual delay φ in phase, the equi-phase straight line coincides with the X-axis indicative of the first filter coefficient T(1). However, when the number N becomes larger than 4, the other equi-phase straight lines (φ=+π/4, +π/2, +π¾) becomes closer to the major axis of the ellipse extending in the quadrant II and the quadrant IV, and hence it can be understood that it becomes difficult to converge the adaptive control. Further, although depiction in the drawings is omitted, when the number N becomes smaller than 4, the equi-phase straight line becomes closer to a major axis of an ellipse extending in the quadrant I and the quadrant III, and hence again it becomes difficult to converge the adaptive control.

In short, the optimum range exists for the number N of pulses of the variable sampling pulse signal (divisional signal). The optimum range is, for example, set to a range of 3≦N≦7 (provided that N is a real number), whereby even if there occurs a delay φ in phase, the filter coefficients can be converged in a short time period. Further, when the number N is set to 4 as in the case of the second embodiment, the locus of the amplitude conditions forms the perfect circle, and hence the equi-phase straight lines are formed in the quadrants I to IV in a balanced manner when there occurs the delay φ in phase, which makes it possible to perform the optimum control. That is, according to the second embodiment, since the number N of pulses of the sampling pulse signal is set to 4, there can be obtained results with an excellent convergence as shown in FIG. 10*a*.

Figure 13:
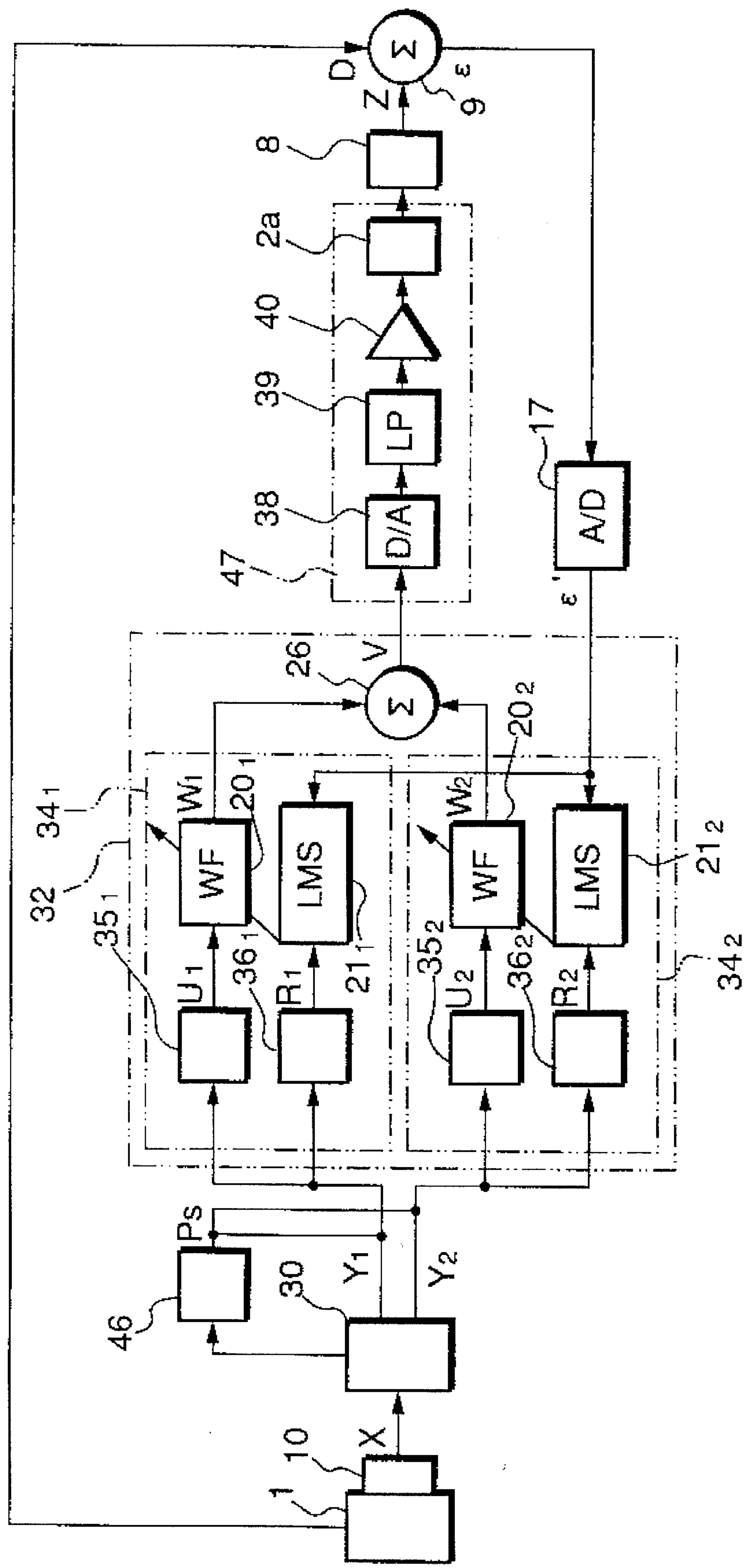
FIG. 13 is a block diagram showing the whole arrangement of a vibration/noise control system according to a third embodiment of the invention.

Next, FIG. 13 shows the whole arrangement of a vibration/noise control system according to a third embodiment of the invention. In this embodiment, a sequence of procedures for updating and delivering the filter coefficients of the W filters $\mathbf{20}_1$, $\mathbf{20}_2$ are under the control of a fixed sampling frequency Fs.

That is, in the third embodiment, the driving frequency pulse signal with-the driving frequency of the ECU 30 (e.g. 20 MHz) is frequency divided by a frequency-divider circuit 46 to form a fixed sampling pulse signal Ps (having a sampling frequency Fs of e.g. 1 KHz), based on which the adaptive control is performed.

More specifically, similarly to the first and second embodiments, the rotation signal X generated by the rotation sensor 10 is input to the ECU 30, from which the timing pulse signals $Y_1$, $Y_2$ dependent on a repetition period of vibrations and noises peculiar to component parts of the engine are delivered to the reference signal-generating circuits $\mathbf{35}_1$, $\mathbf{35}_2$ and the C filters $\mathbf{36}_1$, $\mathbf{36}_2$. On the other hand, the driving frequency pulse signal of the ECU 30 having a driving frequency of e.g. 20 KHz) is frequency divided by the frequency divider circuit 46 to form the fixed sampling pulse signal Ps, which is supplied to the reference signal-generating circuits $\mathbf{35}_1$, $\mathbf{35}_2$ and the C filters $\mathbf{36}_1$, $\mathbf{36}_2$.

In the reference signal-generating circuits $\mathbf{35}_1$, $\mathbf{35}_2$, an filtering degree m for the W filters $\mathbf{20}_1$, $\mathbf{20}_2$ which is indicative of a delay period between a first filter coefficient T(1) and a second filter coefficient T(2) of each of the W filters $\mathbf{20}_1$, $\mathbf{20}_2$ is calculated. For example, assuming that the adaptive control is performed by the fixed sampling frequency of 1 KHz, when the frequency F of occurrence of pulses of the timing pulse signal Y is 10 Hz, 100 pulses of the sampling pulse signal Ps are generated during a repetition period of the timing pulse signal Y. The W filter 20 having the two taps generates four digital values indicative of a sine wave for one repetition period of the timing pulse signal (see FIG. 8*a* to FIG. 8*d*), and hence the degree m of the W filter 20 is set to "25". Similarly, assuming that the adaptive control is performed by the sampling frequency of 1 KHz, when the frequency of the timing pulse signal is 50 Hz, 50 pulses of the sampling pulse signal Ps are generated during a repetition period of the timing pulse signal Y. Therefore, in this case, for processing by the W filter 20 having the two taps, the delay time of the W filter 20, i.e. the degree m of the W filter 20, is set to "5". Thus, in the reference signal-generating circuits $\mathbf{35}_1$, $\mathbf{35}_2$, the degree m is generated according to the frequency of the timing pulse signal Y, for processing by the W filter 20 having the two taps.

Then, the first and second reference signals $U_1$, $U_2$ are subjected to filtering by the W filters $\mathbf{20}_1$, $\mathbf{20}_2$, respectively, to generate the control signals $W_1$, $W_2$, which are then added up by the adder 26 to form the control signal W. The control signal W is converted into an analog signal by the digital-to-analog converter 38, and the resulting analog signal is transmitted through the fixed low-pass filter 39, the amplifier 40, and the self-expanding engine mount 2*a* whereby the driving signal Z is formed, which is input to the vibration error sensor 9.

On the other hand, the vibration/noise signal D from the engine 1 is also input to the vibration error sensor 9. The driving signal Z and the vibration/noise signal D are cancelled by each other to form an error signal (analog) ε, which is detected by the error sensor 9 and delivered to the analog-to-digital converter 17, where it is converted into a digital signal (error signal ε') and then supplied to the LMS processors $\mathbf{21}_1$, $\mathbf{21}_2$. Similarly to the second embodiment described above, the LMS processor $\mathbf{21}_1$ updates the filter coefficients of the W filter $\mathbf{20}_1$ based on the transfer characteristic of the vibration/noise-transmitting path which has been identified in advance and stored into the C filter $\mathbf{36}_1$, i.e. the transfer characteristic-dependent reference signal $R_1$, the error signal ε', the reference signal $U_1$, and the present value of the filter coefficients of the W filter $\mathbf{20}_1$, whereupon an updated control signal $W_1$ is delivered from the W filter $\mathbf{20}_1$, while the LMS processor $\mathbf{21}_2$ updates the filter coefficient of the W filter $\mathbf{20}_2$ based on the transfer characteristic of the vibration/noise-transmitting path which has been identified in advance and stored into the C filter $\mathbf{36}_2$, i.e. the transfer characteristic-dependent reference signal $R_2$, the error signal ε', the reference signal $U_2$, and the present values of the filter coefficients of the W filter $\mathbf{20}_2$, whereupon an updated control signal $W_2$ is delivered from the W filter $\mathbf{20}_2$. The adaptive control of vibrations and noises is thus performed.

The LMS processors $\mathbf{21}_1$, $\mathbf{21}_2$ are driven in synchronism with occurrences of pulses the fixed sampling pulse signal Ps as described above, whereby the first filter coefficients T(1) and the second filter coefficients T(2) of the W filters $\mathbf{20}_1$, $\mathbf{20}_2$ are sequentially updated, respectively. When the engine rotational speed has suddenly changed, and values of the degree m of the W filters $\mathbf{20}_1$, $\mathbf{20}_2$ are updated based on the preceding values, there may be produced discontinuities in the control signals $W_1$, $W_2$, preventing the vibrations and noises from being reduced. Therefore, according to the present embodiment, when the values of the degree m of the W filters $\mathbf{20}_1$, $\mathbf{20}_2$ are changed due to a sudden change of the engine rotational speed NE, the filter coefficients of the W filters 20 are forcedly changed to avoid discontinuities of the control signals $W_1$, $W_2$.

A manner of setting the filter coefficients T(1) and T(2) of the W filter 20 to this end will be described below.

Figure 14:
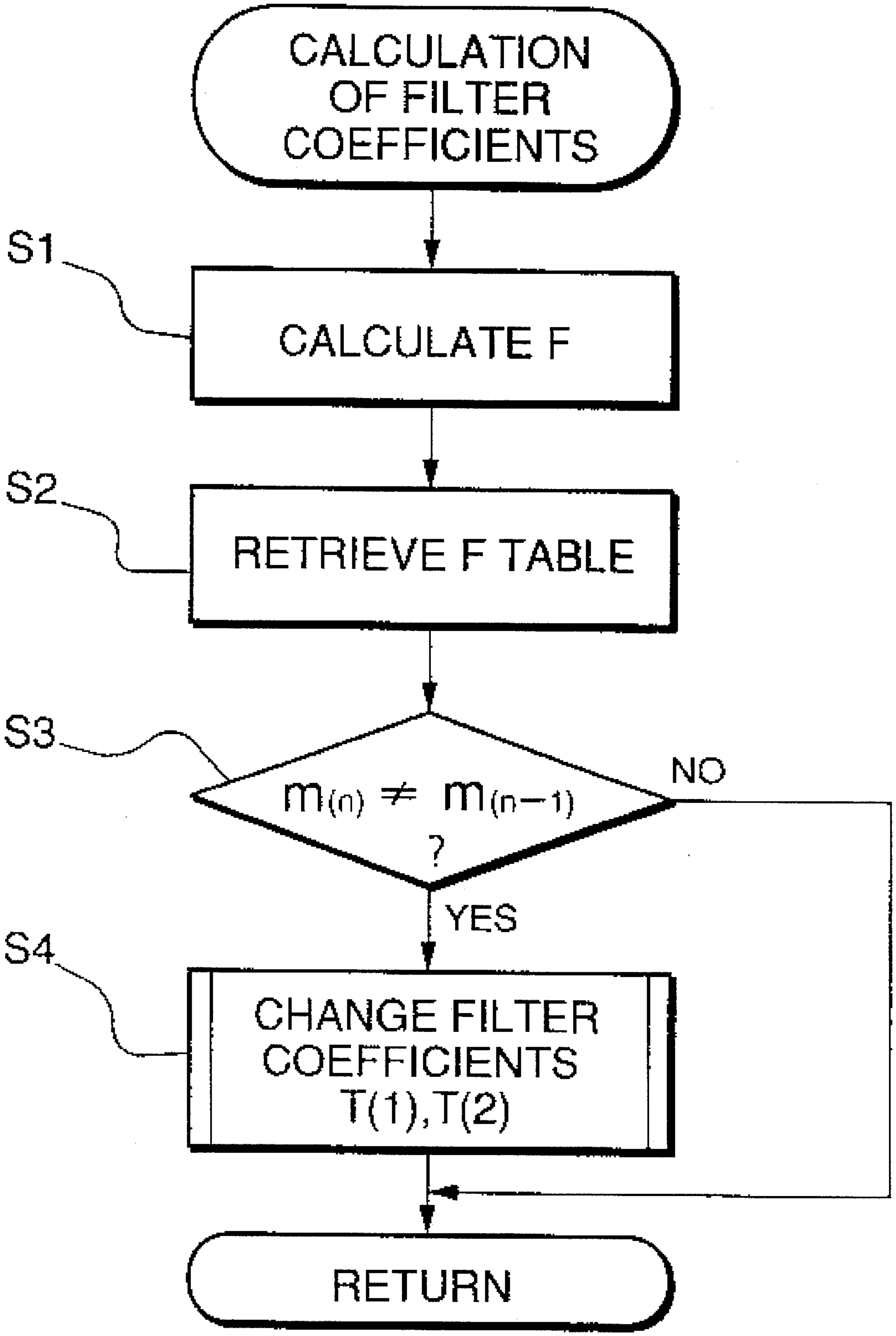
FIG. 14 is a flowchart showing a procedure of calculation of filter coefficients of the W filter when the rotational speed of the engine has suddenly changed.

FIG. 14 shows a program for changing the filter coefficients T(1) and T(2), which is executed by the DSP 32 in synchronism with generation of each timing pulse.

First, at a step S1, the frequency F of the timing pulse Y is calculated based on the output signal from the rotation sensor 10.

Then at a step S2, an F table is retrieved to determine the degree m of the W filter 20 according to the frequency F.

The F table is set, e.g. as shown in FIG. 15, such that table values mmap(0), mmap(1), mmap(2), mmap(3) . . . mmap(n) are provided in a manner corresponding to predetermined ranges $F_1$, $F_2$, $F_3$, . . . Fn−1, Fn of the frequency F. The order number F is set to one of the map values of mmap (1) to mmap(n) according to the frequency F.

Then, the program proceeds to a step S3, where it is determined whether or not the present degree m(n) of the W filter set when the present timing pulse is generated is different from the immediately preceding degree m(n−1) set when the immediately preceding timing pulse was generated. If the answer to this question is affirmative (YES), the program is immediately terminated, whereas if the answer is negative (NO), the program proceeds to a step S4, where the filter coefficients T(1), T(2) are changed, followed by terminating the program.

The filter coefficients T(1), T(2) are changed in the following manner:

The control signal $W_n$ obtained by convolution (product-sum operation) of the filter coefficients T(1), T(2) of the W filter 20$_n$ and corresponding values U(1), U(2) of the reference signal is expressed by Equation (15):

$$\begin{aligned} W &= T(1) \times U(1) + T(2) \times U(2) \\ &= e^{j2\pi(f/fs)(m\times n)}T(1) + e^{j2\pi(f/fs)m(n-m)}T(2) \\ &= e^{j2\pi(f/fs)(m\times n)}\{T(1) + T(2)\, e^{-j2\pi(f/fs)m}\} \end{aligned} \tag{15}$$

Therefore, changes in phase and amplitude by the W filter 20 are expressed by Equation (16):

$$A = T(1) + T(2)e^{-j2\pi(f/fs)m} \tag{16}$$

Assuming that Equation (16) represents the present phase and amplitude of the control signal $W_n$, the phase and amplitude of the control signal $W_n$ assumed when the immediately preceding timing pulse was generated can be expressed by Equation (17):

$$A' = T'(1) + T'(2)e^{-j2\pi(f/fs)m'} \tag{17}$$

When the degree of the W filter 20 has been changed from the immediately preceding value m' to the present value m, Equation (16) and Equation (17) should be identically equal to each other, and hence Equation (18) and Equation (19) hold.

$$T'(1) + T'(2)\cos(2\pi(F/Fs)m') = T(1) + T(2)\cos(2\pi(F/Fs)m) \tag{18}$$

$$T'(2)\sin(2\pi(F/Fs)m') = T(2)\sin(2\pi(F/Fs)m) \tag{19}$$

Therefore, from Equations (18) and (19), the filter coefficients T(1) and T(2) of the W filter 20 are expressed by Equations (20) and (21):

$$T(1) = T'(1) + T(2)\{\cos(2\pi(F/Fs)m') - [\sin(2\pi(F/Fs)m]/[\tan(2\pi(F/Fs)m]\} \tag{20}$$

$$T(2) = T'(2)\{[\sin(2\pi(F/Fs)m']/\sin(2\pi(F/Fs)m]\} \tag{21}$$

Thus, even if the engine rotational speed has changed to change the degree of the W filter 20 from m' to m in the case of the fixed sampling, desired values of the filter coefficients T(1) and T(2) are obtained, to thereby prevent discontinuities from occurring with the control signal W.

Further, in calculation of the filter coefficients T(1) and T(2), computation of trigonometric functions offers heavy load on the DSP. Therefore, it is preferred that by dividing variables such as $(2\pi(F/Fs)m)$ and $(2\pi(F/Fs)m')$ into predetermined value steps of 0.5°, and storing trigonometric function tables, such as a sine table and a tangent table, in which predetermined function values are provided in a manner corresponding to the predetermined value steps of the variables, desired function values may be determined by reading from these tables, or additionally by interpolation.

In addition, although in the second and third embodiments described above, the number N of pulses of the sampling pulse signal (divisional signal) is set to 4, this is not limitative, but so long as the number N is within a range of $3 \leqq N \leqq 7$ (N is a real number), the ratio of the major axis to the minor axis of the equi-amplitude ellipse becomes not so large, and an excellent convergence may be obtained though the controllability is slightly inferior to the case of N=4, making it possible to achieve a desired effect to a sufficient degree. This has already been described with reference to FIG. 12, and detailed description of other cases is omitted in which the number N is set to some other suitable values which provide similarly excellent convergence.

Figure 16:
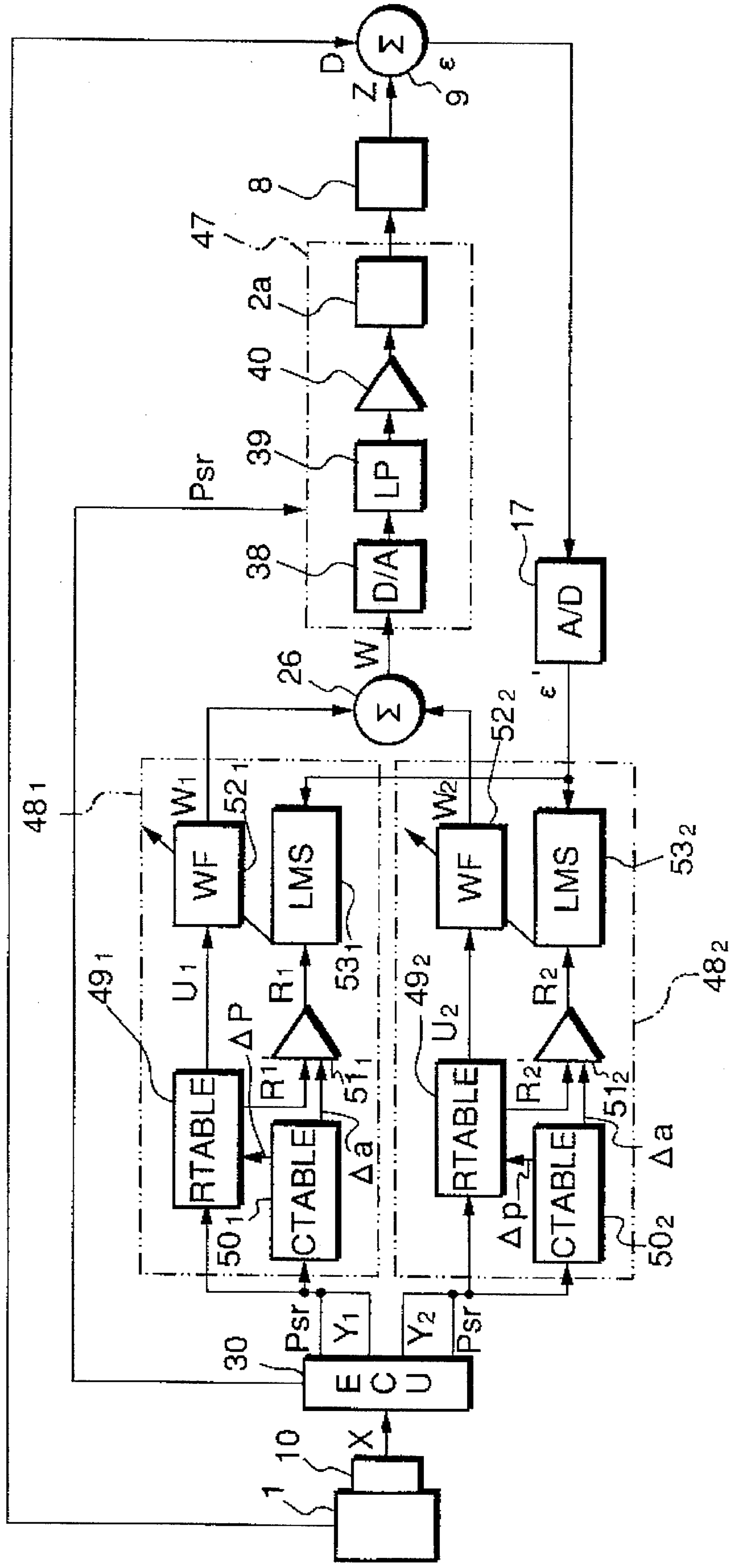
FIG. 16 is a block diagram showing the whole arrangement of a vibration/noise control system according to a fourth embodiment of the invention.

FIG. 16 shows the whole arrangement of a vibration/noise control system according to a fourth embodiment, in which adaptive control circuits 48$_1$, 48$_2$ are comprised of reference signal-storing means (hereinafter referred to as "the R tables") 49$_1$, 49$_2$ which are supplied with variable sampling pulse signals (divisional signals) Psr generated whenever the engine rotates through very small angles, and generate reference signals $U_1$, $U_2$, and basic transfer characteristic-dependent reference signals $R_1'$, $R_2'$ dependent on the variable sampling pulse signals Psr, transfer characteristic memory means (hereinafter referred to as "the C tables") 50$_1$, 50$_2$ for storing the transfer characteristics of the vibration/noise-transmitting path, amplifiers 51$_1$, 51$_2$ for amplifying the amplitudes of the basic transfer characteristic-dependent reference signals $R_1'$ and $R_2'$ delivered from the R tables 49$_1$, 49$_2$, by predetermined gain variables, and LMS processors 53$_1$, 53$_2$ for performing computation for updating the filter coefficients of W filters 52$_1$, 52$_2$, respectively.

Figure 17:
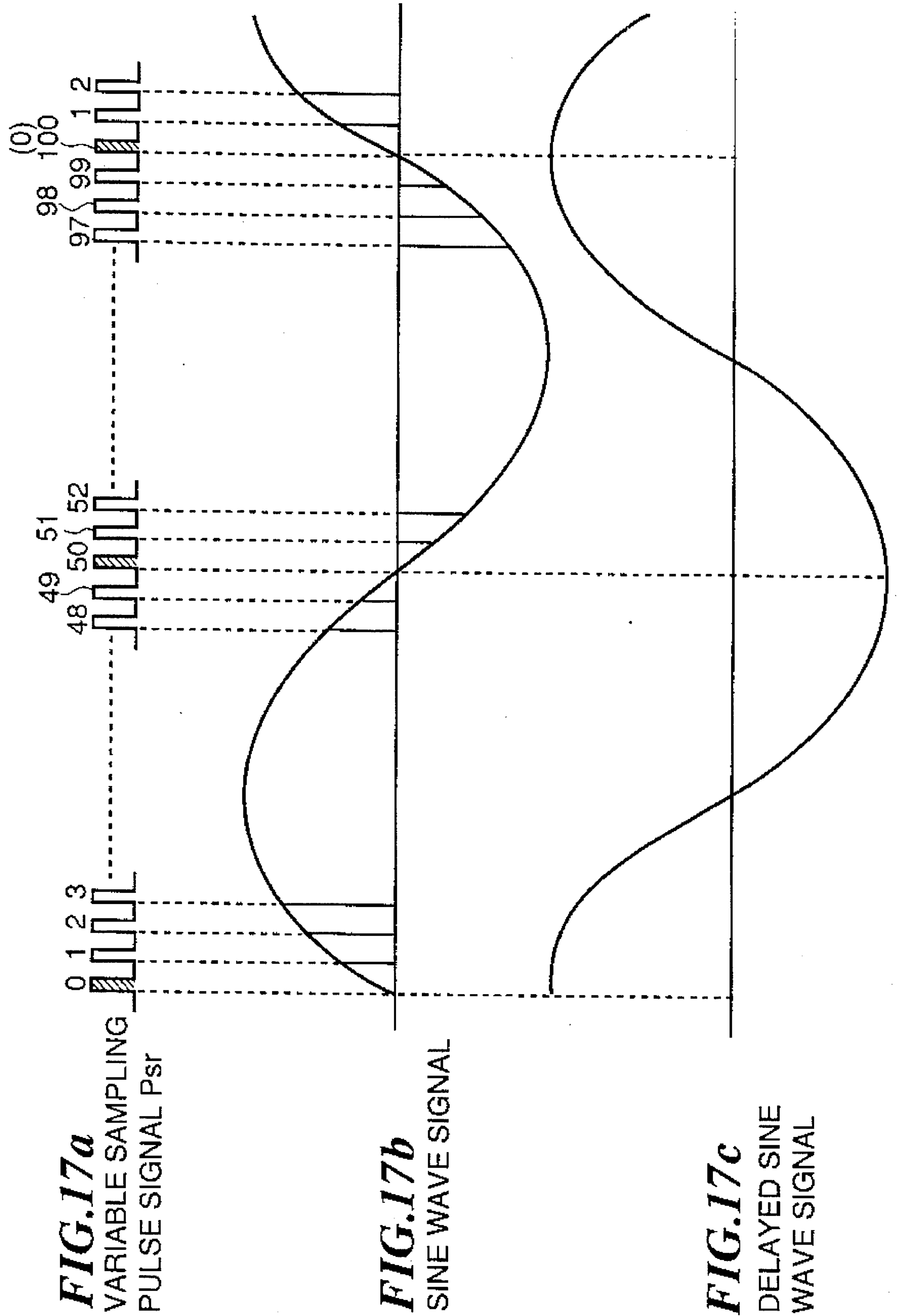

More specifically, as shown in FIG. 17*a* to FIG. 17*c*, the R table 49 stores digital values of a sine wave signal and a delayed sine wave signal delayed by π/2 relative to the sine wave signal, which correspond to pulses of the variable sampling pulse signal Psr produced whenever the engine rotates through each very small angle of rotation, e.g. 3.6°. Then, for example, when the primary vibration component of the engine is to be controlled, during one rotation of the flywheel corresponding to one repetition period of the primary vibration component, 100 pulses of the variable sampling pulse signal are sequentially input to address 0, address 1 . . . , address 99, at equal intervals. The timing of inputting of each pulse of the variable sampling pulse signal Psr is used as a read pointer to deliver digital values indicative of the sine wave signal and the delayed sine wave signal corresponding to the input pulse of the variable sampling pulse signal Psr.

Figure 18:
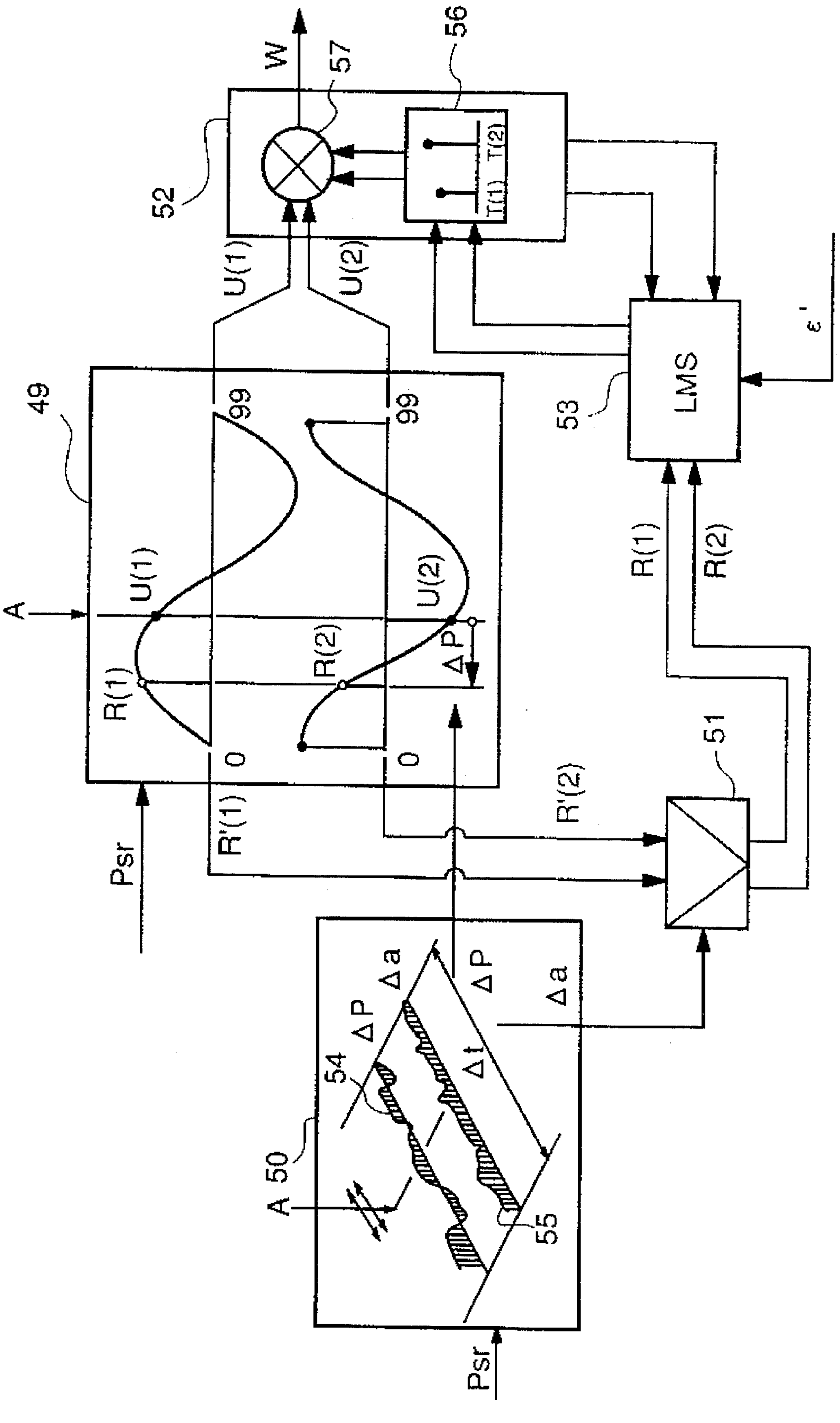
FIG. 18 is a block diagram showing details of essential parts of the fourth embodiment.

Further, a shown in FIG. 18, the C table 50 incorporates a ΔP table in which predetermined values of a shift amount ΔP indicative of a delay ϕin phase relative to the reference signal U are stored, and a Δa table in which predetermined values of a variable Δa indicative of gain of the basic transfer characteristic-dependent reference signals R' delivered from the R table 49 are stored. More specifically, the shift amount ΔP and the variable Δa indicative of gain corresponding to the read pointer (indicated by arrows A in the figure) for reading digital values of the sine wave signal and the delayed sine wave signal, which is determined upon inputting of each pulse of the variable sampling pulse signal Psr, are identified in advance for a vibration/noise-transmitting path. By retrieving the C table 50, the delay ΔP in phase and the gain variable Δa are read therefrom according to the read pointer.

More specifically, by setting the reference signal $U_1$ as the sine wave, and the reference signal $U_2$ as the delayed sine wave, phase/amplitude (transfer characteristic)-related information (the shift amount Δ P and the amount Δa of gain) corresponding to the timing of generation of pulses of the variable sampling pulse signal Psr is determined by retrieving the C table 50. Therefore, without requiring complicated computation processing, whenever each pulse of the variable sampling pulse signal Psr is input, the R table 49 and the C table 50 are retrieved to thereby determine a single set of a digital value of U(1), a delayed digital value of U(2), a transfer characteristic-dependent reference signal R(1), and a transfer characteristic-dependent reference signal R(2), which are responsive to timing of generation of pulses of the variable sampling pulse signal Psr, in a uniquely predetermined manner.

In the vibration/noise control system having the above construction, as shown in FIG. 16 and FIG. 18, the variable sampling pulse signal Psr is delivered from the ECU 30 to the R table 49 and the C table 50. Then, in synchronism with inputting of the variable sampling pulse signal Psr, digital values indicative of a sine wave signal and a delayed sine wave signal corresponding to the position of the read pointer (designated by the arrows A in FIG. 18) are read out and supplied to the W filter 52 as the reference signals U(1) and U(2). On the other hand, from the C table 50, whenever each pulse of the variable sampling pulse signal Psr is input, the shift amount ΔP and the gain variable Δa of corresponding to the position of the read pointer are read out. The shift amount ΔP is delivered to the R table 49 from which a digital value of the sine wave signal and a digital value of the delayed sine wave signal shifted by the shift amount ΔP are delivered as the basic transfer characteristic-dependent reference signals R'(1) and R'(2) to the amplifier 51. Then, the amplifier 51 amplifies the basic transfer characteristic-dependent reference signals R'(1) and R'(2) by the gain variable Δa supplied form the C table 50 into the transfer characteristic-dependent reference signals R(1) and R(2), which are then input to the LMS processor 53.

Then, at the LMS processor 53, the filter coefficients T(1) and T(2) of the W filter 52 are updated based on Equations (22) and (23).

$$T(1)(i+1)=T(1)(i)+\mu\times R(1)\times\epsilon' \quad (22)$$

$$T(2)(i+1)=T(2)(i)+\mu\times R(2)\times\epsilon' \quad (23)$$

where T(1)(i+1) and T(2)(i+1) represent updated values of the filter coefficients T(1) and T(2), and T(1)(i) and T(2)(i) represent the immediately preceding or non-updated values of the filter coefficients T(1) and T(2). μ represents a step-size parameter for controlling an amount of correction for updating the 0 coefficients, which is set to a predetermined value dependent on the object of control.

A filter-updating block 56 of the W filter 52 carries out updating of the filter coefficients of the W filter, and a multiplying block 57 of same multiplies the updated filter coefficients T(1) and T(2), by the reference signals U(1) and U(2) to deliver the control signal W.

The control signal W delivered from the W filter 52 via the adder 26 is converted into an analog signal by the digital-to-analog converter 38 by the use of each pulse of the variable sampling pulse signal Psr from the ECU 30 as a trigger. The resulting analog signal is supplied via the low-pass filter 39, the amplifier 40 and the self-expanding engine mount 2*a*, to be supplied to the vibration error sensor 9 as the driving signal Z. On the other hand, the vibration/noise signal D from the engine 1 as the vibration/noise source is input to the vibration error sensor 9. The driving signal Z and the vibration/noise signal D are canceled by each other to form an error signal ε, which is detected by the sensor 9. The error signal ε is delivered to the analog-to-digital converter 17, where it is sampled into a digital signal ε' by the use of each pulse of the variable sampling signal pulse Psr as a trigger. .The resulting digital signal ε' is delivered to the LMS processors $\mathbf{53}_1$, $\mathbf{53}_2$ for updating the filter coefficients of the W filters $\mathbf{52}_1$, $\mathbf{52}_2$, as described above.

Thus, according to the fourth embodiment, the sine wave signal and the delayed sine wave which is delayed in phase by π/2 relative to the sine wave signal are simultaneously input to the W filter 52, and hence the W filter outputs a cosine wave signal delayed by a quarter of a repetition period relative to the sine wave signal.

Figure 19A:
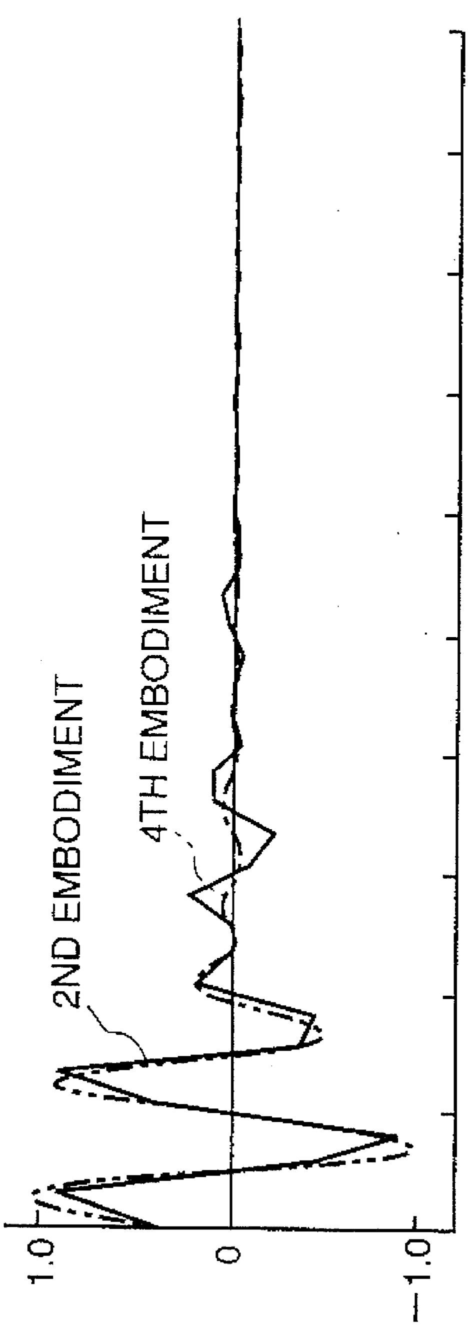
Figure 19B:
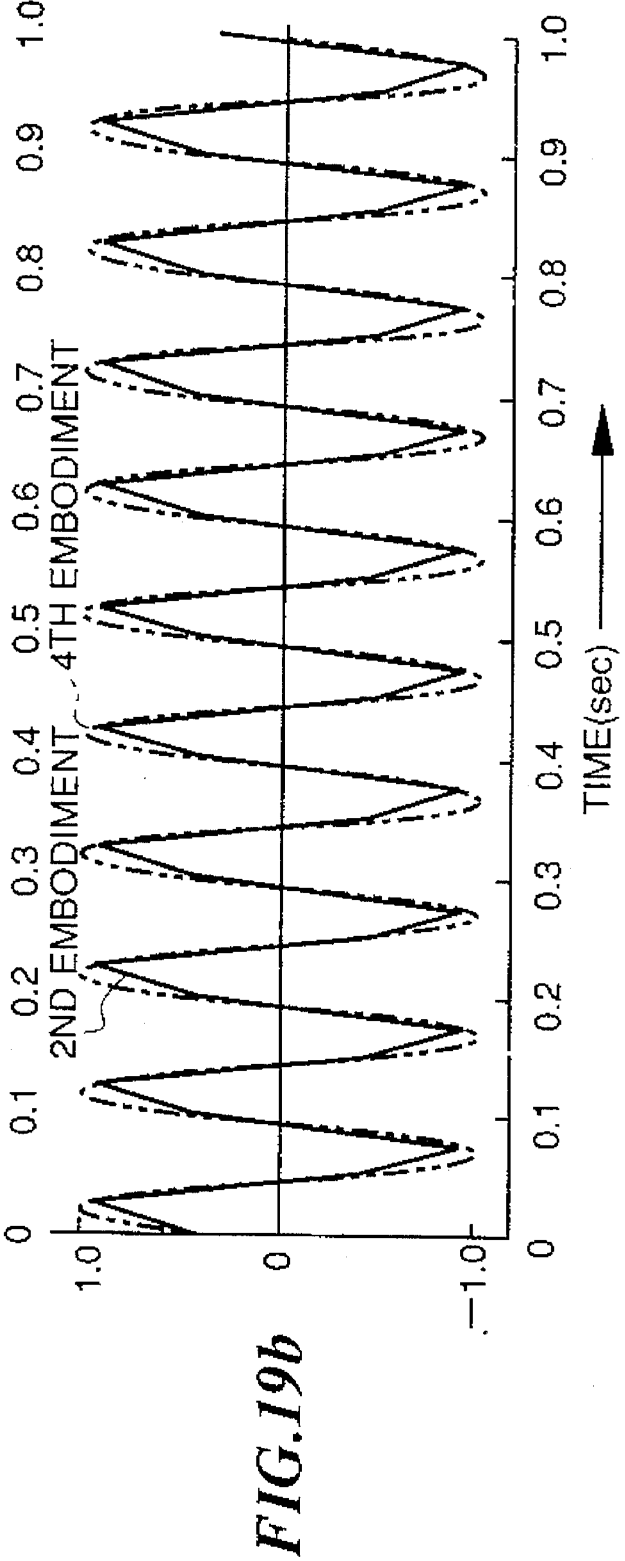

FIG. 19 shows the convergence of the adaptive control performed by the fourth embodiment after the start of the adaptive control, in comparison with that of the adaptive control performed by the second embodiment. The abscissa designates time (sec) and the ordinate represents amplitude of error signals ε. In the figure, two-dot chain lines designate examples of convergence of the adaptive control by the fourth embodiment, whereas solid lines designate those of convergence of the adaptive control by the second embodiment. A delay ϕ in phase of the control signal caused by the vibration/noise-transmitting path is 0.05 sec in terms of time. FIG. 19*a* shows changes in amplitude of the control signal after the adaptive control has been started, while FIG. 19*b* shows changes in same when the adaptive control is not performed.

A coefficient of one of the two taps of the adaptive digital filter is updated based on the reference signal formed based on the sine wave, while that of the other of the two taps by the reference signal formed based on the delayed sine wave. Thus, by dividing a repetition period of vibrations and noises into very small sections, and simultaneously delivering the sine wave and the delayed sine wave which is delayed by a predetermined delay ratio M relative to the repetition period of the sine wave, there can be obtained effects similar to those obtained by the second embodiment in which are delivered digital values of a sine wave divided by four. Moreover, compared with the second embodiment in which the reference signal is generated based on digital values read out by merely dividing a repetition period of vibrations and noises by four, in the fourth embodiment, one repetition period of the vibrations and noises is divided into 100 sections, and digital values of the sine wave signal and the delayed sine wave signal corresponding to the sections are sequentially read out to form the reference signals. Therefore, as shown in FIG. 19*a*, this makes it possible to perform even more delicate control, and at the same time attain an even higher convergence of the control.

Further, although in the fourth embodiment, the predetermined delay ratio M is set to ¼(=π/2), desired effects can be sufficiently obtained so long as the predetermined delay ratio M is within a range of ⅓≧M≧1/7 (M is a real number) for the reason set forth in the description of the second embodiment.

Further, although in the fourth embodiment, the sampling frequency is variable, this is not limitative, but similarly to the second embodiment, a predetermined frequency obtained by frequency-dividing the driving frequency pulse signal (having a frequency of e.g. 20 MHz) of the ECU 30 may be used as the sampling frequency to perform the adaptive control in a similar manner. In this case, the repetition period of timing pulse Y varies with the engine rotational speed, and therefore if the repetition period of the sampling pulse signal is so short as compared with the repetition period of the timing pulse signal Y, identical digital values of the sine wave signal, the shift amount ΔP and the gain variable Δa are read out several times, whereby it is possible to perform the same processing as performed by obtaining the digital values of the sine wave, the shift amount, and further the gain variable, on the basis of variable sampling.

As described heretofore, according to the present invention, the reference signal U is formed by a sine wave, which makes it unnecessary to use high-order frequency characteristics related to the transfer characteristics of the vibration/noise-transmitting path, and a filter having a large number of taps. Accordingly, it is not required to store data related to transfer characteristics of the vibration/noise-transmitting path in advance a large number of storage elements, either. By storing data of a transfer characteristic of the path identified in advance, and reading values thereof according to the engine rotational speed in a suitable manner, a phase and an amplitude of the control signal can be corrected properly. This makes it possible to simplify the system as well as to increase the converging speed of the adaptive control.

Further, by forming a sampling frequency based on the driving frequency of the control means for controlling a rotational member, the adaptive control can be executed by a fixed sampling frequency, which makes it possible to perform the adaptive control by the fixed sampling frequency. A sequence of operations for outputting and updating of the filter coefficients of the first filter means are carried out in synchronism with generation of each pulse of a sampling pulse signal, whereby it is possible to perform the adaptive control by a variable sampling period.

Further, by storing data related to transfer characteristics of the vibration/noise-transmitting path into the transfer characteristic-storing means, parameters indicative of the transfer characteristic can be read out according to repetition period of the sampling pulse signal.

Further, the present invention is not limited to the preferred embodiments described above by way of examples. It is to be understood that variations and modifications may be made thereto so long as they do not constitute departures from the scope and spirit of the invention. For example, in the above embodiments, the teeth of the ring gear mounded on the flywheel are counted, and based on the rotation signal formed by detection thereof, the pulse signal Y is directly formed. However, if the number of teeth is too large, it goes without saying that it is only required to frequency-divide the rotation signal to form the pulse signal Y. Further, as to the error signal $\epsilon$, it is preferable to attenuate components other than vibration/noise components in advance by the use of a band-pass filter and the like. Further, according to the present invention, one repetition period of the reference signal U is formed by a single repetition period of a sine wave signal corresponding to one repetition period of the vibrations and noises as the object of the control are and hence by separating vibration components of respective orders by discrete Fourier transformation, it is possible to even more enhance the accuracy of the adaptive control. Further, it is relatively easy to reduce influence of noise components by preventing signals from being correlated with each other by the use of orthogonal transformation by discrete cosine transform.

Further, although, in the above embodiments, the self-expanding engine mount incorporating the actuator is used as an electromechanical transducer, this is not limitative, but the present invention may be applied to a case in which a loudspeaker or the like is used as the electromechanical transducer for control of noises.

Further, although, in the above embodiments, the two orders of vibrations, i.e. the primary and secondary vibration components are objects of the adaptive control, it goes without saying that more than two orders of vibrations and noises can be effectively controlled by applying the adaptive control of the present system thereto.

What is claimed is:

1. In a vibration/noise control system for controlling vibrations and noises generated from a vibration/noise source, with a periodicity or a quasi-periodicity, said vibration/noise source having at least a rotational member, including first filter means for generating a control signal for control of said vibrations and noises, a driving signal-forming means for converting said control signal into a driving signal to be delivered to a vibration/noise-transmitting path through which said vibrations and noises are transmitted, error signal-forming means for generating an error signal indicative of a difference between said driving signal transmitted through said vibration/noise-transmitting path and a vibration/noise signal indicative of said vibrations and noises generated from said vibration/noise source, second filter means for generating a transfer characteristic-dependent reference signal reflecting a transfer characteristic of said vibration/noise-transmitting path, and control signal-updating means for updating filter coefficients of said first filter means based on said error signal output from said error signal-forming means, said transfer characteristic-dependent reference signal output from said second filter means, and said filter coefficients of said first filter means, such that said error signal becomes the minimum, the improvement comprising:

pulse signal-generating means for detecting rotation of said rotational member whenever said rotational member rotates through each predetermined very small degree, and generating a pulse signal indicative of detected rotation; and reference signal-forming means for forming a reference signal corresponding to a repetition period of vibrations and noises peculiar to a component part of said vibration/noise source, based on an interval of occurrences of pulses of said pulse signal generated by said pulse signal-generating means, and delivering said reference signal to said first filter means;

wherein said reference signal-forming means has sine wave-forming means for forming a sine wave having a single repetition period per said repetition period of said vibrations and noises peculiar to said component part of said vibration/noise source, and wherein said second filter means has:

correction value-selecting means for selecting a correction value representative of said transfer characteristic according to a rotational speed of said rotational member, and transfer characteristic-dependent reference signal-forming means for correcting said reference signal based on said correction value selected by said correction value-selecting means, into said transfer characteristic-dependent reference signal.

2. A vibration/noise control system according to claim 1, wherein said correction value-selecting means has a table storing data of said transfer characteristic of said vibration/noise-transmitting path.

3. A vibration/noise control system according to claim 1, wherein said first filter means comprises at least one adaptive digital filter.

4. A vibration/noise control system according to claim 1, wherein said first filter means includes control signal correction value-selecting means for selecting a control signal correction value depending on variation in said rotation of said rotational member, and control signal-forming means for correcting said reference signal based on said control signal correction value to form said control signal.

5. A vibration/noise control system according to claim 4, wherein said control signal correction value-selecting means includes first storage means for storing filter coefficients corresponding to a predetermined transfer characteristic dependent on said rotational speed of said rotational member, and second storage means for storing results of updating by said control signal-updating means for updating said filter coefficients of said first filter means, and selects one of said filter coefficients corresponding to said predetermined transfer characteristic stored in said first storage means and said results of updating by said control signal-updating means, depending on a change in said rotation of said rotational member.

6. A vibration/noise control system according to claim 4, wherein said control signal is delivered from said first filter means, and at the same time said error signal from said error signal-forming means is detected in synchronism with said pulse signal generated by said pulse signal-generating means.

7. In a vibration/noise control system for controlling vibrations and noises generated from a vibration/noise source, with a periodicity or a quasi-periodicity, said vibration/noise source having at least a rotational member, including first filter means having an adaptive digital filter for generating a control signal for control of said vibrations and noises, a driving signal-forming means for converting said control signal into a driving signal to be delivered to a vibration/noise-transmitting path through which said vibrations and noises are transmitted, error signal-forming means for generating an error signal indicative of a difference between said driving signal transmitted through said vibration/noise-transmitting path and a vibration/noise signal indicative of said vibrations and noises generated from said vibration/noise source, second filter means for generating a transfer characteristic-dependent signal reflecting a transfer characteristic of said vibration/noise-transmitting path, and control signal-updating means for updating filter coefficients of said first filter means based on said error signal output from said error signal-forming means, said transfer characteristic-dependent reference signal output from said second filter means, and said filter coefficients of said first filter means, such that said error signal becomes the minimum, the improvement comprising:

driving repetition period signal-generating means for generating a driving repetition period signal corresponding to a repetition period of vibrations and noises peculiar to a component part of said vibration/noise source, whenever said rotational member rotates through a predetermined rotational angle;

divisional signal-generating means for generating a plurality of pulses of a divisional signal during a repetition period of said driving repetition period signal generated by said driving repetition period signal-generating means; and reference signal generating means for generating a reference signal formed of a sine wave having a single repetition period per said repetition period of vibrations and noises according to timing of inputting of said divisional signal generated by said divisional signal generating means;

wherein said adaptive digital filter of said first filter means has two taps; and the number N of said plurality of pulses of said divisional signal generated by said divisional signal-generating means per said repetition period of said driving repetition period signal is within a range of $3 \leqq N \leqq 7$, where N is a real number.

8. A vibration/noise control system according to claim 7, wherein the number N of said plurality of pulses of said divisional signal set by said setting means is equal to 4.

9. A vibration/noise control system according to claim 7 or 8, wherein said setting means is formed by frequency-dividing means for frequency-dividing a driving frequency pulse signal used in said control means.

10. A vibration/noise control system according to claim 7, including sampling period signal-generating means for generating a sampling period signal indicative of a sampling repetition period for controlling a sequence of operations for delivering and updating filter coefficients of said first filter means, based on a driving frequency for driving control means for controlling said rotational member, and delay period-determining means for determining a delay period of said adaptive digital filter based on said repetition period of said driving repetition period signal generated by said driving repetition period signal-generating means and said sampling period signal, said system comprising delay period-changing means for changing said delay period according to a change in said repetition period of said driving repetition period signal when said repetition period of said driving period has changed, and filter coefficient-changing means for forcibly changing said filter coefficient of said adaptive digital filter.

11. In a vibration/noise control system for controlling vibrations and noises generated from a vibration/noise source, with a periodicity or a quasi-periodicity, said vibration/noise source having at least a rotational member, including first filter means having an adaptive digital filter for generating a control signal for control of said vibrations and noises, a driving signal-forming means for converting said control signal into a driving signal to be delivered to a vibration/noise-transmitting path through which said vibrations and noises are transmitted, error signal-forming means for generating an error signal indicative of a difference between said driving signal transmitted through said vibration/noise-transmitting path and a vibration/noise signal indicative of said vibrations and noises generated from said vibration/noise source, second filter means for generating a transfer characteristic-dependent reference signal reflecting a transfer characteristic of said vibration/noise-transmitting path, and control signal-updating means for updating filter coefficients of said first filter means based on said error signal output from said error signal-forming means, said transfer characteristic-dependent reference signal output from said second filter means, and said filter coefficients of said first filter means, such that said error signal becomes the minimum, the improvement comprising:

driving repetition period signal-generating means for generating a driving repetition period signal corresponding to a repetition period of vibrations and noises peculiar to a component part of said vibration/noise source, whenever said rotational member rotates through a predetermined rotational angle;

divisional signal-generating means for generating a large number of pulses of a divisional signal during each repetition period of said driving repetition period signal generated by said driving repetition period signal generating means whenever said rotational member rotates through each very small rotational angle; and reference signal-storing means for storing a reference signal dependent on timing of occurrence of pulses of said divisional signal, said reference signal being delivered to said first filter means;

wherein said adaptive digital filter of said first filter means has two taps; and wherein said reference signal storing means has sine wave storing means for storing a single repetition period of a sine wave corresponding to said repetition period of said vibrations and noises generated from said vibration/noise source, and delayed signal storing means for storing a delayed sine wave signal delayed by a predetermined delay ratio M relative to said repetition period of said sine wave signal, said predetermined delay ratio M is within a range of $\frac{1}{3} \geqq M \geqq \frac{1}{7}$, where M is a real number.

12. A vibration/noise control system according to claim 11, wherein said predetermined delay ratio M set by said setting means is equal to ¼.

13. A vibration/noise control system according to claim 11, including sampling period signal-generating means for generating a sampling period signal indicative of a sampling repetition period for controlling a sequence of operations for delivering and updating filter coefficients of said first filter means, based on a driving frequency for driving control means for controlling said rotational member.

14. A vibration/noise control system according to claim 11, including execution means for executing said sequence of operations for delivering and updating filter coefficients of said first filter means, in synchronism with occurrence of said pulses of said divisional signal.

15. A vibration/noise control system according to claim 11, wherein said second filter means includes transfer characteristic storage means for storing phase and amplitude-related transfer characteristics of said vibration/noise-transmitting path, and selects and delivers one of said phase and amplitude-related transfer characteristic stored in said transfer characteristic storage means according to each interval of occurrence of said pulses of divisional signal generated by said divisional signal generating means.

16. A vibration/noise control system according to claim 15, wherein said transfer characteristic storage means includes gain variable-storing means for storing a gain variable of said transfer characteristic-dependent reference signal input to said control signal-updating means.

* * * * *